United States Patent
Gelashvili

(10) Patent No.: US 12,443,833 B2
(45) Date of Patent: Oct. 14, 2025

(54) SYSTEMS AND METHODS FOR NEURAL NETWORK CONVOLUTIONAL LAYER MATRIX MULTIPLICATION USING CACHE MEMORY

(71) Applicant: Neuralmagic Inc., Somerville, MA (US)

(72) Inventor: Rati Gelashvili, Cambridge, MA (US)

(73) Assignee: RED HAT, INC., Raleigh, NC (US)

( * ) Notice: Subject to any disclaimer, the term of this patent is extended or adjusted under 35 U.S.C. 154(b) by 1040 days.

(21) Appl. No.: 17/271,326

(22) PCT Filed: Aug. 27, 2019

(86) PCT No.: PCT/US2019/048236
§ 371 (c)(1),
(2) Date: Feb. 25, 2021

(87) PCT Pub. No.: WO2020/046859
PCT Pub. Date: Mar. 5, 2020

(65) Prior Publication Data
US 2021/0201124 A1    Jul. 1, 2021

Related U.S. Application Data

(60) Provisional application No. 62/723,350, filed on Aug. 27, 2018.

(51) Int. Cl.
*G06F 17/00*    (2019.01)
*G06F 17/16*    (2006.01)
(Continued)

(52) U.S. Cl.
CPC ............. *G06N 3/063* (2013.01); *G06F 17/16* (2013.01); *G06N 3/08* (2013.01)

(58) Field of Classification Search
CPC ............ G06N 3/063; G06N 3/08; G06N 3/04; G06N 3/045; G06F 17/16; G06F 15/8046; G06F 9/5061
(Continued)

(56) References Cited

U.S. PATENT DOCUMENTS 5,577,166 A    11/1996 Mizuno
9,558,156 B1    1/2017 Bekas et al.
(Continued)

FOREIGN PATENT DOCUMENTS

EP    3 037 980    6/2016
WO    WO 2017/049496    3/2017
(Continued)

OTHER PUBLICATIONS

Deshpande, A beginner's guide to understanding convolutional neural networks, Jul. 20, 2016.
(Continued)

*Primary Examiner* — Jason T Edwards
(74) *Attorney, Agent, or Firm* — PEARL COHEN ZEDEK LATZER BARATZ LLP

(57) ABSTRACT

A computer processor may include a number of cores, a shared cache shared among the cores, and a local cache associated with each core and used by that core only. Input data for a neural network (NN) layer may be partitioned into a set of tiles of size T×T, and the tile set may be partitioned into blocks of R tiles. For each block, a core may perform a transform operation on the tiles to produce transformed data matrices fitting in a local cache, and a set of multiply operations, each multiply operation using a transformed data matrix and a transformed kernel matrix from a set of transformed kernel matrices. The set of transformed kernel matrices may fit in the shared cache. The result of at least
(Continued)

one of the multiply operations may be stored in a location used to store a transformed data matrix.

19 Claims, 7 Drawing Sheets

(51) Int. Cl.
  *G06N 3/063* (2023.01)
  *G06N 3/08* (2023.01)
(58) Field of Classification Search
  USPC .......................................................... 706/26
  See application file for complete search history.

(56) References Cited

U.S. PATENT DOCUMENTS

| | | | |
|---|---|---|---|
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,521,488 | B1* | 12/2019 | Ross ................... G06F 15/8046 |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0032487 | A1 | 2/2017 | Ashari et al. |
| 2017/0103313 | A1 | 4/2017 | Ross et al. |
| 2017/0103317 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0270073 | A1* | 9/2017 | Badin ................... G06N 3/063 |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0179869 | A1* | 6/2019 | Park ................... G06F 12/0802 |
| 2019/0205746 | A1* | 7/2019 | Nurvitadhi ............. G06N 3/045 |
| 2019/0212982 | A1 | 7/2019 | Yoda et al. |
| 2019/0278600 | A1* | 9/2019 | Frumkin ................ G06F 9/3877 |
| 2019/0303743 | A1 | 10/2019 | Venkataramani et al. |
| 2019/0311242 | A1* | 10/2019 | Chen ........................ G06N 3/04 |
| 2019/0354894 | A1 | 11/2019 | Lazovich et al. |
| 2019/0370071 | A1 | 12/2019 | Matveev et al. |
| 2019/0370644 | A1 | 12/2019 | Kenney et al. |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0117701 | A1* | 4/2020 | Ohno ..................... G06F 17/16 |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0293783 | A1* | 9/2020 | Ramaswamy ......... G06F 18/256 |
| 2020/0302284 | A1* | 9/2020 | Garcia Garcia ......... G06N 3/08 |
| 2020/0342301 | A1 | 10/2020 | Miao et al. |
| 2024/0078417 | A1* | 3/2024 | Temam ................... G06F 17/16 |

FOREIGN PATENT DOCUMENTS

| | | |
|---|---|---|
| WO | WO 2018/053835 | 3/2018 |
| WO | WO 2019/090325 A1 | 5/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Alwani et al., "Fused-layer CNN accelerators." 49th Annual IEEE/ACM International Symposium on Microarchitecture (MICRO), 2016, pp. 1-12.
Du et al., "Width Provably Matters in Optimization for Deep Linear Neural Networks", May 27, 2019, arXiv:1901.08572v3.
Gale et al., "The State of Sparsity in Deep Neural Networks", Feb. 25, 2019, arXiv:1902.09574v1.
Han et al., "Learning both Weights and Connections for Efficient Neural Networks", 2015, Advances in Neural Information Processing Systems, vol. 28.
Hinton et al., "Distilling the Knowledge in a Neural Network", Mar. 9, 2015.
Lavin et al., "Fast Algorithms for Convolutional Neural Networks", Nov. 10, 2015.
Lecun et al., "Optimal brain damage", Advances in neural information processing systems, 1990, pp. 598-605.
Mishra et al., "Apprentice: Using Knowledge Distillation Techniques to Improve Low-Precision Network Accuracy", Nov. 15, 2017.
Rusu et al., "Progressive Neural Networks", Sep. 7, 2016.
Budden et al., "Deep tensor convolution on multicores", In Proceedings of the 34th International Conference on Machine Learning, 2017, vol. 70, pp. 615-624.
Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.
Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.
Kaya et al., "Scalable sparse tensor decompositions in distributed memory systems", SC'15: Proceedings of the International Conference for High Performance Computing, Networking, Storage and Analysis, IEEE, 2015. (Year: 2015).
Kim et al., "Designing Vector-Friendly Compact BLAS and LAPACK Kernels", SC17, Nov. 12-17, 2017, Denver, CO, USA.
Lascorz et al., "Bit-Tactical: Exploiting Ineffectual Computations in Convolutional Neural Networks: Which, Why, and How", Mar. 9, 2018.
Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.
Papyan et al., "Convolutional neural networks analyzed via convolutional sparse coding." In: The Journal of Machine Learning Research. Jul. 17, 2017 (Jul. 17, 2017) Retrieved on Feb. 20, 2020.
Scardapane et al. "Group sparse regularization for deep neural networks.", In: Neurocomputing. Jul. 2, 2016 (Jul. 2, 2016) Retrieved on Nov. 16, 2019 (Nov. 16, 2019).
Smith et al., "SPLATT: Efficient and parallel sparse tensor-matrix multiplication", 2015 IEEE International Parallel and Distributed Processing Symposium, IEEE, 2015, (Year: 2015).

(56) References Cited

OTHER PUBLICATIONS

Wozniak et al., "GiMMiK-Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA-2019-01.

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Yang, Huanrui, Wei Wen, and Hai Li. "Deephoyer: Learning sparser neural network with differentiable scale-invariant sparsity measures." arXiv preprint arXiv:1908.09979 (2019).

Yuster, Raphael, and Uri Zwick. "Fast sparse matrix multiplication." ACM Transactions On Algorithms (TALG) 1.1 (2005): 2-13.

Paixao, Crysttian A., and Flávio Codeco Coelho. Matrix compression methods. No. e1049. PeerJ PrePrints, 2015.

Park, Jongsoo, et al. "Faster cnns with direct sparse convolutions and guided pruning." arXiv preprint arXiv:1608.01409 (2016).

https://www.kinematicsoup.com/news/2016/9/6/data-compression-bit-packing-101, published Sep. 6, 2016.

\* cited by examiner

SYSTEMS AND METHODS FOR NEURAL NETWORK CONVOLUTIONAL LAYER MATRIX MULTIPLICATION USING CACHE MEMORY

RELATED APPLICATION DATA

This application is a National Phase Application of PCT International Application No. PCT/US2019/048236, International Filing Date Aug. 27, 2019, which claims benefit from U.S. provisional patent application 62/723,350 filed on Aug. 27, 2018 and entitled "SYSTEM AND METHOD FOR USING L3 CACHE MEMORY IN A NON-LAYERED EXECUTION OF CONVOLUTIONAL AND OTHER TYPES OF NEURAL NETWORK COMPUTATIONS", each of which being expressly incorporated herein by reference in its entirety.

FIELD OF THE INVENTION

The invention relates generally to neural network matrix multiplication; specifically to performing matrix multiplication for convolutional neural networks.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. Neurons may be termed nodes, however nodes may also be used in NN terminology to refer to the machines that execute a virtualized NN. In common NN implementations, the signal at the link between artificial neurons may be for example a real number, and the output of each neuron may be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the output layer, and a lower layer, preceding layer, or a layer "below" another layer, is a layer towards the input layer.

Such systems may learn to perform analysis by considering example input data, generally without being programmed with any analysis-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) is a deep, feed-forward network, which includes one or more convolutional layers, fully connected layers, and pooling layers. CNNs are particularly useful for visual and speech applications.

A NN may be modelled as an abstract mathematical object, such as a function. Thus the NN may be "virtual" and no actual physical neurons, links, etc. may exist, these existing rather as data executed by processors. A NN may be translated physically to a CPU (e.g. a traditionally architecture computer, such as a PC) or graphics processing units (GPUs, specialized processors) as for example a sequence of matrix operations where entries in the matrix represent neurons and/or links (e.g. artificial neurons connected by edges or links) or other NN parameters and matrix functions represent functions of the NN. GPUs and similar massively parallel hardware devices may be used to provide the large amounts of compute typically needed to train and/or perform inference in NNs. GPUs can have thousands of relatively weak compute cores, and small caches, but high memory bandwidth. This contrasts with traditional CPU architectures, that have few powerful cores, very large caches, low memory bandwidth, and have each core executing different instructions at different times in an asynchronous fashion.

In both GPU and CPU architectures, the neural network's weights and inputs may be represented as matrices, and the computation of the network (e.g. the inference or run-time operation) includes a sequence of multiplications of these matrices. Thus, developing fast matrix multiplication algorithms is key to the performance of NNs. Inference is the use of NN to perform an analysis, e.g. run-time, which can be contrasted with training, when a NN learns from data.

One of the well-known problems in executing CNNs is the desire to maximize the amount of computation for every data item that is brought into memory during the network execution. In the current approaches to executing such networks, on both GPUs and CPUs, computation proceeds in a synchronous or semi-synchronous fashion layer after layer, first creating all the outputs of the prior layer and only then feeding them as inputs to the next layer. This leads to a performing very low amount of computation per data, which means that much of the time is spent bringing data in as opposed to computing on it.

Input data to a CNN layer may have a number of channels, e.g. RGB (red, blue, green) or more abstract channels such as the output of filters. The output of a CNN layer may be features. A CNN may iterate a patch or tile smaller than the size of the input data across the input data to produce outputs. In a CNN layers may be connected by the application of filters, which are applied repeatedly to patches or tiles of input, and which may be represented as "kernels", or matrices.

A transform-reverse transform operation such as fast Fourier transform or Winograd transform may speed CNN computation by transforming input matrices to another form, performing the matrix multiply on the transformed matrices, and performing the reverse transform to produce the output. Other transforms may be used. In performing a transform, a tile size for the transform may be used which is not related to or the same as the tile size of the original filter or kernel. Typically, in some NN layers, a set of data (e.g. input data to the NN, or intermediate data produced by a NN layer) is multiplied by numbers that are determined by the NN structure, links and weights, and filter or kernel structure of a NN. A filter may be in the context of a convolutional NN layer an operation performed on a subset of input data (e.g. a tile), and a kernel may be the set of fixed data used to multiply against input data to execute a NN.

In a typical modern CPU processor there may be several layers of cache. For example, in Intel processors, the third level of cache, known as the L3 cache, is typically large and shared among all of a processor's computing cores. Other level caches, such as L1 and L2, are faster and private to a specific core. For caches and memory, the compute-to-memory ratio (CMR) may be defined as the number of compute operations that one must perform per item brought into a given memory level (main memory or cache) to hide the latency of bringing the data item in (and out). Arithmetic intensity (AI) of an algorithm may be the number of compute operations per byte of data. If the arithmetic intensity of an algorithm executed on some architecture is not higher than the compute-to-memory ratio of some memory level on that architecture, the execution may be memory bound, bottlenecked on bringing the data in or out of that memory level at some point in the execution. This may happen at least AI/CMR portion of the time, which is a measure that may be referred to as the compute utilization at the given memory level.

Compute utilization typically measures a theoretical maximum. For example, if an algorithm has full compute utilization (more than 100%) at all memory levels, then theoretically the execution of the algorithm can be compute bound, e.g. never limited by the memory bandwidth. However, being actually compute bound depends on how the memory accesses are distributed—if the algorithm performs all memory accesses before performing all computation, the average compute utilization of the whole algorithm may be high, but the first stage of its execution will be extremely memory bound. But when an algorithm has a reasonably uniform memory access distribution, then it is likely to utilize a fraction of the CPU's available floating point operations per second (FLOPS) which is close to its theoretical maximum (e.g. minimum of compute utilization among all memory levels).

Caching may occur at a granularity of cache lines (e.g. 64 bytes, but other dimensions may be used) and if the cached data has a bad alignment in memory, this may result in the overhead of unnecessary data being brought to the cache along with the cache lines. The best (cache-friendly) memory layout is typically storing data consecutively, as this results in small overhead.

SUMMARY

A computer processor may include a number of cores, a shared cache shared among the cores, and a local cache associated with each core and used by that core only. Input data for a neural network (NN) layer may be partitioned into a set of tiles of size T×T, and the tile set may be partitioned into blocks of R tiles. For each block, a core may perform a transform operation on the tiles to produce transformed data matrices fitting in a local cache, and a set of multiply operations, each multiply operation using a transformed data matrix and a transformed kernel matrix from a set of transformed kernel matrices. The set of transformed kernel matrices may fit in the shared cache. The result of at least one of the multiply operations may be stored in a location used to store a transformed data matrix.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
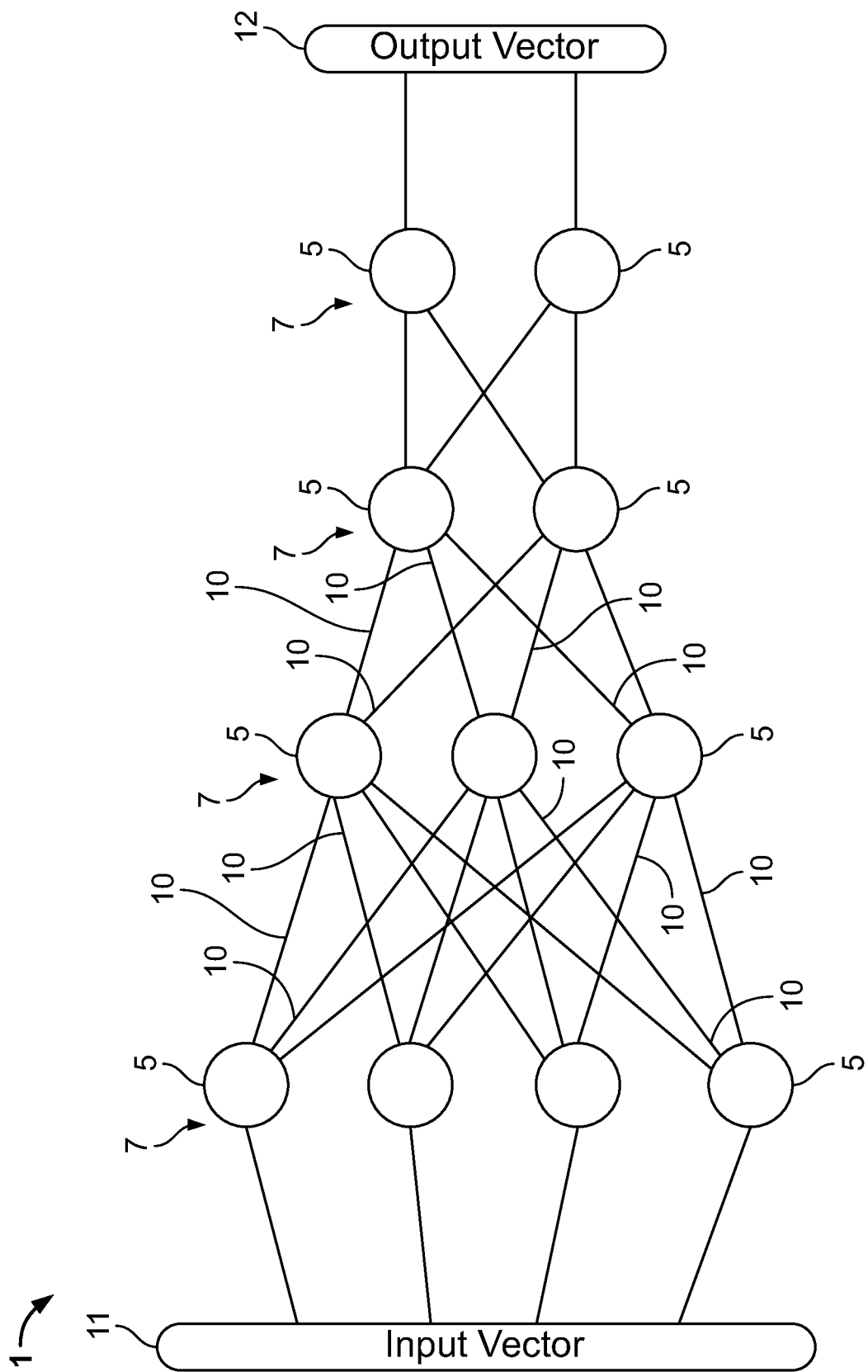
FIG. 1A is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may perform or use shared cache (e.g. L3) "fusion" matrix processing, that can perform matrix transforms and multiplications for CNNs more efficiently on CPUs by utilizing the CPU's shared (e.g. L3) cache in order to avoid many of the expensive operations of reading and writing to main memory (e.g. memory external to the processor; separate from caches) during the execution of convolutional layers. Embodiments may fuse certain operations in a transform-multiply-inverse transform operation, e.g. the output of a transform may be in some sense fused with multiplication and a reverse transform. In particular, in current technology, computing the first few layers of a CNN may take a significant portion of the overall network computation time because this computation is in some cases memory bound. Embodiments of the invention may use task ordering and task definition, and data partitioning, to make this part of the computation as compute bound as possible.

Embodiments described herein are described in the context of the execution pattern of a convolutional layer in a CNN, but may be generalized for use in other contexts. Applications other than NNs may use matrix multiply operations which may benefit from greater efficiency.

An embodiment may execute matrix multiply operations for certain layers of a NN which use a transform-multiplyinverse transform operation, typically convolutional layers. Embodiments typically operate using a computer processor which on the same chip includes a number of cores each able to execute a processing thread in parallel with other cores' processing of other threads, the cores sharing a cache (in one architecture, the L3 cache), each core associated with a local cache used by that core only (which may be called the L2 cache). Based on the target processor, parameters may be defined which are used to control divisions or partitions of the data used and the tasks provided to each core. Each convolutional layer for which an improved process as described herein is desired may have kernel or filter data for that layer divided based on at least some of these parameters, one of which may be termed T. The kernel data for the particular layer may be divided into tiles each being of size T×T. The same T is used to divide the input data for that layer: input data for the layer may be divided or partitioned into tiles each being of size T×T, resulting in a set of tiles. Each data tile set is further divided or partitioned into tasks: the data tile set may be partitioned into blocks of tiles each containing R tiles, R being another parameter, where the matrices resulting from a tile transform, and the matrices representing multiply results, based on the block, fit in a local cache of a core (typically each local or private cache for a core is of the same size, within a particular target processor).

If a transform-multiply-inverse transform operation is applied to more than one layer within a NN, it may be that the partition into tiles and tasks is different for each layer, since details such as the kernel and data or input size may be different. If a "pyramid" operation is performed, as described elsewhere herein, it may be the case that the data for each of the two layers are considered together to determine R and T, to determine a sequence of R and T parameters for each convolutional layer in a pyramid operation that is performed using transformed computation. For instance, if there are two such layers in the pyramid operation, and the first layer uses parameters R1 and T1, the second layer could use different parameters R2 (possibly not equal to R1) and T2 (possibly not equal to T1), and all such parameters may be determined based on the data and layer dimensionality of all the layers that belong to the pyramid operation. A different R' and T' may be used for a second convolutional layer in a NN when compared to a first convolutional layer. Information considered when generating parameters for a pyramid operation may include information describing other layers in the pyramid which are not transformed convolutions, e.g. pooling or normal convolution layers. Performing a pyramid operation may affect cache considerations, and cache considerations may affect parameters such as R and T.

The various cores may, in parallel, execute threads of a transform-multiply-inverse transform operations: for each block of R tiles, a core may perform transform operation on the R tiles which define a task to produce a set of transformed data matrices such that the transformed matrices and the matrices that will result from multiplication (typically using a shared-buffer scheme) fit in the local cache for the core, and perform a set of multiply operations using a transformed data matrix and a transformed kernel matrix. A shared buffer may be used both to hold transformed data matrices used for a task and the output of the multiply operations, where the core stores the results of the multiply operation in a location used to store a transformed data matrix from a previous multiply operation, one-by-one replacing the transformed data matrices in the shared buffer with output from multiply operations. The shared buffer may be allocated to external memory but as a practical matter may be stored in the local or private cache to the core, and the transformed kernel data may as a practical matter be stored in the shared cache for the processor, both due to the parameters governing the size of the data and tasks, and the processor's cache policy.

Embodiments of the present invention may improve the operation of processors executing NNs, and may improve the technology of NN execution. Embodiments of the present invention may improve the speed and memory usage of a NN transform-multiply-inverse transform operation in part by designing the process to make high usage of a processor's caches, reducing time-consuming memory access. Prior art methods may use a processor's cores to first compute or transform all lefthand (e.g. data) tiles, and after this is performed, bring from memory, piece by piece, righthand (e.g. kernel) data for multiplication. All tiles may be transformed since every transformed tile generates data requiring multiplications by each right hand-matrix, and this way every righthand matrix may be brought into a cache private to a core only once (and multiplied by everything that it needs to be multiplied by at once, while remaining in the private cache). However, the data produced by transforming all tiles can be large and typically does not fit in the caches (private or shared). Hence, during multiplication by the right hand matrix, the transformed data may be read from the main memory, which is significantly slower than reading it from cache (private or shared).

The prior art approach of first transforming all input data, and then bringing each right hand matrix once to a core's private cache, and then multiplying may be less efficient. Embodiments of the present invention may provide an improvement over prior art methods as intermediate computation results (e.g. transformed left hand matrices and the output multiplied matrices) may never be written to main memory or read from the main memory. In prior art methods that first transform all data matrices, it is typically not possible to fit all transformed data in a cache, and thus such data is stored in main memory; when multiplication is performed, the data is read from main memory. Similarly after multiplication, if all data is multiplied in prior art methods, it may be stored in main, external, memory, and then read from main memory for inverse transforms. Embodiments of the present invention may allow for the same data to be generated but by chunks that fit in a private cache, so when it is read again (e.g. to multiply or inverse transform) it is read from a private cache.

Embodiments of the present invention may order or arrange the operations performed by cores (e.g. by dividing the data into chunks which define tasks) to perform a smaller transform operation on data combined with a multiply operation: thus embodiments do not compute all transforms on all left matrices at once, and only after that is complete multiply this block of transformed matrices by all transformed kernel data. Improvements from embodiments of the present invention may come from the inventor's observation that with proper sizing of the tiles, transformed kernel tiles (transformed into matrices) cannot all fit into a core's private cache, but can fit in the processor's and cores' shared cache. With multiple cores "touching" kernel data in a shared cache at once, that data should stay in the shared cache due to a processor's cache policy.

While matrix multiplication in the NN context is discussed, embodiments may provide improvements in non-NN contexts. In embodiments of the present invention, the results of the data (left hand) transform may be kept in cache due to the sizing of data and the tasks, and thus can be read from cache, not re-read from main or external memory, for the matrix multiplication.

In some prior art implementations, where a cache shared among cores is available, the dimensions of data relevant to transform-multiply operations is not considered. In other prior art implementations, such as those using GPUs where a private or local cache may be minimal or nonexistent, all data is placed in a shared cache and all GPU processors work on the same input. In contrast, embodiments of the present invention allow for different cores to work on different tasks where some data (e.g. that stored in a private cache) is different among cores, and other data (e.g. kernel data stored in a shared cache) is shared among cores performing different tasks.

Other NN architectures and arrangements may be used: e.g. different layers may be used, and a direct convolution need not be used.

A transform operation may perform a transform (e.g., fast Fourier transform (FFT) or Winograd, but other transforms may be used) on the inputs, then a matrix multiplication on the transformed data, and then an inverse transform. These operations are compute intensive and also involve bringing into memory or cache significant amounts of data.

Embodiments may break the transform, matrix multiplication and inverse transform steps of the convolutional layer computation into a set of small, independent tasks, which satisfy number of properties. While multiple cores working on tasks which involve adjacent tiles may intersect in part of data they read, they can work independently and compute their respective output. The tasks when discussed herein are defined by a set of data to be operated on, where the process—the code of software executed to operate on the data—is the same for each task. These tasks may be distributed among and performed by available cores in a processor, possibly using a load balancing mechanism. Each task may operate on its input data, which is a small part of the whole input of the convolutional layer. Critically, the tasks may be designed in such a way that at any point in time in the computation, the intermediate data on which the computation is performed can be split into two categories:

Data that can fit in a cache local or private to the core performing the task (e.g. L2, or core-dedicated, core-exclusive or core-private).

Data that cannot fit in the local or private (e.g. L2) cache of the core, but can fit in the shared (e.g. L3) cache.

The second type of data in every task can remain unchanged through the computation (e.g. the right-hand matrices, typically kernel or filter data, in the matrix multiplication step). Such right hand matrices may in CNNs be repeatedly applied across the face of an input layer. Hence, embodiments may keep, in some cases at all times, this data in L3 cache without having it evicted, from where the cores read it directly when needed.

Tasks may be structured in such a way that maximizes the amount of useful data kept in the private (e.g. L2) cache of the core, which is important for increasing the amount of computation performed per data item. Embodiments may reuse the same storage location in the local or private cache for inputs and outputs of the matrix multiplication, e.g. in a "shared buffer". This may produce a significant improvement or increase (in some cases, close to doubling) compute utilization in NN execute technology. Embodiments of the invention may improve CNN executions because for example:

The shared cache (e.g. L3) compute-to-memory ratio may be much lower than the compute-to-memory ratio of main memory (typically memory external to the processor, separate from cache storage). Hence, keeping data in the L3 cache and accessing it from there may facilitate getting a good compute utilization.

The shared cache may have improved latency (each operation takes less time).

Embodiments having the ordering of computations as described herein may have known improvement over prior fully synchronous approaches where the results of a transform are first stored in memory (typically main memory, as the whole transformed input is large) until the whole input is transformed, then re-read for the matrix multiplication. Similarly, the results of the matrix multiplication in prior methods are first stored in main memory, then re-read for the inverse transform. Advantages of embodiments of the present invention may include avoiding having many instances when a large amount of data is written to or read from main memory which may extend the time during which an algorithm is compute bound; and a lower synchronization overhead.

Embodiments may facilitate "pyramid" style computing schemes. Embodiments may allow pyramid style tasks to execute completely through a convolutional layer implemented using a transform and can have a pyramid task execute through several convolutional layers. Such a "pyramid" approach is described in embodiments of U.S. patent application Ser. No. 16/426,609, filed on May 30, 2019, entitled "SYSTEMS AND METHODS FOR IMPROVED NEURAL NETWORK EXECUTION", incorporated herein by reference in its entirety.

Embodiments may improve performance in NN execution by providing high, or full, compute utilization for operations such as AVX2 and AVX512 SIMD operations on Intel processors, or similar operations on other architectures. On architectures supporting AVX512 SIMD instructions, embodiments may allow a Fourier transform with a much larger tile size than typical Winograd transforms currently in use (e.g. 16 for Fourier vs. 5-8 for Winograd). A larger tile size implies a significant reduction in the total number of operations to execute a convolutional layer.

Some embodiments may use data partitioning and task partitioning, and cache usage, as described applied to a pyramid execution mechanism for the first two convolutional layers of a Visual Geometry Group (VGG) network. Cores may start by reading pieces of an input image from memory, and read or write nothing else to main memory during the rest of the computation. Instead, cores may extensively utilize the shared (e.g. L3) cache to generate the transformed tiles of, in some cases, the third layer's input.

Embodiments may be used in places based on calculations provided herein, e.g. to decide when to use some embodiments, where in the network layers to start applying it and where to end the sequence of layers computed as a pyramid in the pyramid tasks that utilize it. Embodiments can be applied in a sparse convolutional setting, where it might end up being even more beneficial with respect to alternatives because the overall amount of computation is reduced by the sparsification (a pruning algorithm) process (since the time spent accessing memory becomes even more pronounced in comparison to the time spent computing). With proper settings of parameters, embodiment may be applied to 3D convolutions, and settings where the data is represented differently, e.g. as a complex number.

Consider without loss of generality an input to a CNN layer that has a shape $B \times D1 \times D2 \times Cin$, where B is the batch-size, D1 and D2 are the dimensions (this can be generalized to the 3-dimensional case by having an extra× D3), and Cin is the number of input channels. This CNN layer may be implemented through a transform that works with a square tile of size T×T (in the 3D case: T×T×T). The whole input is then covered by such tiles, which may overlap with each other. The same covering of D1×D2 board by tiles of size T×T is repeated B×Cin times. The tiles may be aligned along the batch and input channel dimensions. Covering D1×D2 board by tiles may include that each performed convolution be contained within some tile. This way, every tile together with its corresponding tiles along input channels defines an independent computation, outputs of all of which contain the whole output of the layer. In some cases tiles may need to overlap. Otherwise, there would be an output, computing which would require data from different tiles. For example, if T=4 and a 2×2 convolutional kernel is used with stride 1, consecutive tiles along a dimension may need to share at least one input.

When discussed herein, a tile used in a transform is a patch or portion of a larger set of data (e.g. input data or input kernel), typically a square of certain dimensions, which is used as input to a process. Typically the dimension of tile used in a transform is T×T (input data and kernel/filter tiles having the same dimension), and the number of left and right hand matrices multiplied by the transformed convolutions algorithm is $T^2$. However, dimensions of the matrices used in these processes are not necessarily T×T. For example, each left matrix in a transform multiplication may have dimensions R×Cin, and the right matrix dimension may be Cin×Cout, producing result matrix of dimension R×Cout. There may be $T^2$ of these left-right hand matrix pairs multiplied because a process may create one left matrix per one position in the transformed input tiles and one right hand matrix per one position in the transformed kernel tiles. In a typical multiplication, the lefthand matrices are input data (e.g. input to a NN, output from a layer which is input to the next) and the typical righthand matrix is data such as, in the case of a convolutional layer, filters (typically described by kernel data) linking two layers via channels. After the transform, there are the same number of lefthand (e.g. data) and righthand (e.g. kernel) matrices, $T^2$.

During the transformed computation of a CNN layer, the entire computation that may occur to obtain the output of the CNN layer may include, for example:

(Step 1) Transforming each input tile in the transformed (e.g. Fourier or Winograd) space. Mathematically, this may be a basis transformation, equivalent to multiplying the tile by a certain matrix to get the transformed tile. In standard transforms, the matrix used for the transformation may have a specific structure such that the transformation can be performed very efficiently (in particular, much more efficiently than a general matrix-matrix multiplication).

(Step 2) Applying the convolution in the transformed space. This can be represented as $T^2$ (T squared) matrix-matrix multiplications, where each row of the left-hand matrix contains transformed inputs at a particular location in a tile for each input channel, and the right-hand matrix has size Cin×Cout, where Cin is the number of input channels and Cout is the number of output channels. The output of the multiplication may have the same structure as the left-hand matrix but with the output number of channels Cout (equal to the number of columns). This matrix-matrix multiplication is the most compute-intensive part of the computation.

(Step 3) The output of the matrix-matrix multiplication may be reshuffled back to obtain transformed output tiles of size T×T. At this point the number of tiles from the first step is changed by a factor of Cout/Cin. Each tile may be transformed back from the transform space by applying the inverse basis transformation. Computationally this is analogous to the first step. The result is the pieces of output corresponding to each tile that combined together may form the output of the CNN layer (in some cases, assuming the tiling of the input was done with the proper overlap).

While Steps 1, 2 and 3 are described, other numbers of steps and sequences may be used.

While the general transformed computation that needs to happen is known (transform-multiply-reshuffle/inverse transform), performing this computation in a multicore environment may require an improved multicore algorithm. In this case, a multicore algorithm determines how the computation is split among the cores, how each core performs its parts of the computation, and how cores synchronize with each other. These decisions can have dramatic effect on the performance. For instance, the main memory access count and pattern is critical: reading the same data multiple times worsens the compute utilization of the algorithm, and so does writing intermediate results of the computations to the main memory and re-reading them into cache later. An algorithm may also require accesses to main memory if a core operates on data that does not fit in the cache, and the computation and access patterns can lead to the data getting evicted from the cache before the access. Similar problems can arise at other levels of cache hierarchy, e.g. excessive accesses to the shared (e.g. L3) cache without enough computation can lead to a bad compute utilization at the shared cache level. If two programs require the same amount of computation (it can be different, e.g. if one requires the cores to re-do some calculations) then the program with lower compute utilization is more likely to be bottlenecked by memory accesses and ultimately have much worse performance.

Embodiments of the invention may provide an improved design of a multicore algorithm for transformed computations which can have a major improvement on performance. The difference in performance can be large enough to be decisive whether or not it is worth to perform a direct or a transformed convolution.

Figure 3:
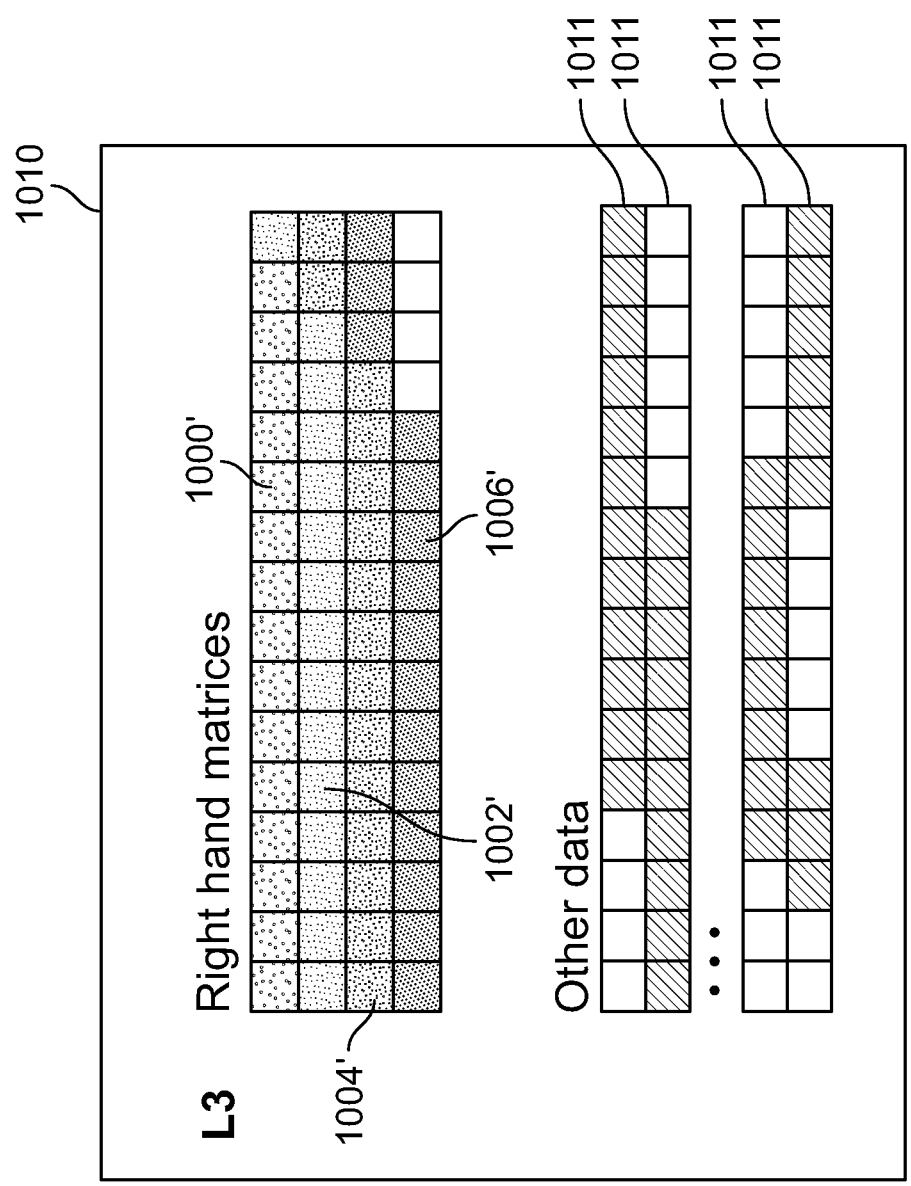
FIG. 3 is a diagram of a cache storage scheme according to embodiments of the present invention.
Figure 3:
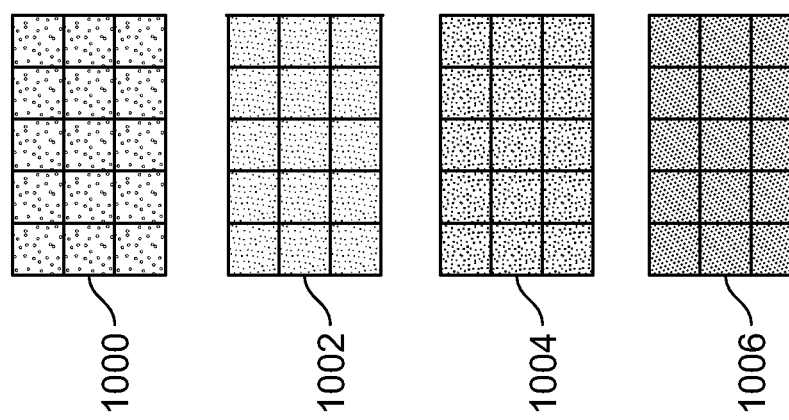

FIG. 3 is a diagram of a cache storage scheme according to embodiments of the present invention. Matrices 1000, 1002, 1004, and 1006, when T=2, are 4 transformed right-hand matrices each with dimensionality of an example Cin×Cout. For certain convolutional layers in typical CNNs, it is possible to keep all the right-hand side matrices in step 2 (multiplication of the transformed CNN computation, e.g. applying the convolution in the transformed space) in the shared cache at all times, as can be seen in entries 1000', 1002', 1004', and 1006' in shared (e.g. L3) cache 1010. The parameters T, Cin, Cout may be such that the $T^2$ matrices (each of size Cin×Cout) can comfortably fit in the shared cache 1010. This is shown in FIG. 3 as the right-hand matrices occupy a number of cache lines 1010, while there are more cache lines 1011 available to store other data. These matrices are typically only read and never updated during the computation.

A "comfortable" fit may include for example using at most 50-75% of the cache for the data desired to be kept there (e.g. input data for a private cache; kernel data for a shared cache). In such a case 25-50% of the cache may be available for other data. Other "fits" or amounts available for other data may be used, both for the shared and private caches.

These matrices can be stored contiguously in memory and cache-line boundary aligned, where each matrix occupies a continuous piece of memory starting from a memory location that corresponds to a beginning of some cache line: while as discussed a core accesses external memory, due to the processor's cache policy the data will typically actually be stored in a cache. This can be accomplished during transforms by writing the transformed data in particular memory layouts that correspond to the resulting matrices used in the algorithm being continuous and cache-line aligned. A designer of NN inference software including embodiments of the present invention may decide how or where the resulting data is to be written, or in other words, laid out. Alignment in this context may refer to starting each matrix or piece of data that is used at the cache line boundaries (to prevent an unnecessary cache line being read read). A process may be designed so kernel matrices are laid out continuously, where individual matrices may be cache line aligned. During execution cores may generate this data by transforms, and a designer of a process dictates in what order the data is generated and how to store each result.

An example memory alignment is demonstrated in FIG. 3. This may be a good layout with respect to the cache associativity mapping, resulting in negligible overhead for caching these matrices. In the example in FIG. 3, 3 out of 4 cache lines 1010 storing the four right-hand matrices are fully utilized. Storing the data continuously ensures that all but at most two cache lines (e.g. first and last) are fully utilized, and aligning the start of the data at the cache line boundary ensures that all but possibly the last cache line are fully utilized. Even if data is stored continuously it may not start or end at a cache line boundary: thus an embodiment may attempt to align the start of stored data with the start of a cache line (in which case the last cache line may have some unused or trailing slots). These aspects may be more important in practical scenarios with more, larger matrices. Embodiments may also store results of intermediate computation continuously in memory (accessing external memory, but aiming to have such data stored in a cache) for good caching behavior, such that there is less pressure to evict data, including the right-hand matrices, from the shared cache. When a CNN computation is broken into tasks performed by cores, where each task is performing computation on a subset of the input, each task may require the core to access all of the $T^2$ right-hand side matrices. In some embodiments a thread or task being processed by a core may not make a final decision as to what data is accessed from/written to a main external memory, but based on a target architecture cache policy (e.g. cache lines working such that if that the data is laid out sequentially, it will also be stored in cache like that) may fit more data in the cache, e.g. by storing data sequentially in memory.

Cache coherence protocols are typically proprietary to the hardware producer, so cache behavior cannot be guaranteed, but when the stored data is frequently accessed, contiguous in memory and occupies a relatively small portion of the cache size, it can be expected that these accesses to be cache hits most of the time for any reasonable cache coherence protocol.

In some prior art systems, the right-hand matrices typically do not fit in the local, core-exclusive or core-private (e.g. L2) caches: this may mean that a given core in a prior art system cannot rely on significant amount of the data that it needs being stored in a local cache and not getting evicted. However, embodiments of the present invention may use the observation that in transformed CNN computations, if all cores do similar, suitably sized tasks (using different input data but the same kernel data), they will access the same data (e.g. the same right-hand matrices), and thus some embodiments may structure the data so that the commonly used data can be stored in a shared cache and used concurrently by all cores. As discussed elsewhere, while embodiments endeavor to store certain data in a shared cache and certain data in a private cache, this cannot be fully controlled by a process executing on a processor. Thus some kernel data is likely to be stored in an L2 cache as part of a multiply operation, but typically should not persist in the L2 cache. Data other than kernel and data matrices is likely to be stored in shared and private caches, but embodiments endeavor to keep such other data from causing kernel and data matrices from being evicted.

Embodiments may use data partitioning and task partitioning, and cache usage, as described herein, such that the conditions described above can be met and the right-hand matrices remain in the shared (e.g. L3) cache during the execution of each task. Embodiments may exploit that the CMR requirement of the shared L3 cache may be lower (e.g. approximately 3 times) than that of the main memory. One embodiment may set a parameter T to allow all right hand (e.g. filter or kernel) matrices to fit in the shared (e.g. L3) cache, without regard to the number of input channels (Cin). A parameter R, which may define the division of data into groups of data to be processed, or "tasks", e.g. the granularity of the work done by each core, may be used to divide the matrices into tasks for each core. A parameter R may determine how much input (e.g. number of tiles along with all input channels) are processed by one core at a time (e.g. transforming data into left hand matrix, multiplying by a right hand matrix (which typically comes from a shared cache) and inverse transform to get the output). Embodiments may have all this data read once from main memory (where input data is typically stored) but then remain in the local/private cache of the core performing doing the computation on it. Cores may read and access the data based on an external memory address (as is known, processes may have their own virtual address space that is mapped to the actual physical memory addresses), but the cache coherence policy of the processor, in combination with the design of the executed coded according to embodiments of the invention, may allow for the data being read from memory once. Thus, after the transform the data is in the local/private cache a multiplication can read it quickly, and after multiplication by a right hand matrix it is still in the local cache, so an inverse transform operation can read it quickly. The amount of this data if stored naively may be $R \times T^2 \times Cin$ for left hand matrices and $R \ T^2 \times Cout$ for product matrices, which can be stored according to some embodiments of the invention in less than $R \times T^2 \times Cin + R \times T^2 \times Cout$ space (e.g. if input and output stored separately as in the prior art, the size of the storage used is much more).

In some embodiments, the savings in the compute utilization due to reading right-hand matrices from the L3 cache may allow generating left-hand matrices that are not as tall and require relatively small amount of memory (because the process may afford less computation in the matrix multiplications). Embodiments may also ensure that these left-hand matrices have a good memory layout (e.g. are stored contiguously). As a result, in some embodiments, it can be expected that the left-hand matrices in the matrix multiplication are (e.g. completely, or mostly) read from the core-specific (e.g. L2) cache. The results of the matrix multiplication may be stored in the L2 cache with a good layout. Additional measures may be taken to ensure this data remains in the L2 cache by the time the inverse transform needs to access it. One such measure is repeatedly accessing the cached memory lines—the specific matrix related data desired to be kept in the cached—to keep the data "warm" in the relevant cache, e.g. reduce the risk of eviction.

Embodiments may use an improved and novel technique in the context of transformed computations that reuses the same memory buffer, e.g. a "shared buffer", for left-hand matrices and the results of the matrix multiplications. In the step 2 of the transformed computation (matrix multiply of transformed matrices), there may be $T^2$ left-hand matrices and $T^2$ "result matrices", e.g. the results of the multiplications with the corresponding right-hand matrices. If the size of each left-hand matrix is S bytes, the size of each result matrix is S×Cout/Cin bytes. Let Smax be the maximum and Smin be the minimum of these values. Embodiments of the invention may cause the processor to, using its cache protocol, keep left hand matrices results in the cache, by reading and writing data in a certain manner addressed to memory: due to cache policies, the data should be kept in the cache private to the core performing the operations. Thus, when embodiments of the present invention are described as reusing the same memory buffer, in practice such embodiments will be designed to re-use the same cache storage areas which are addressed or accessed as if they were in memory external to the processor.

A "shared buffer" embodiment may store results of intermediate computations in external memory in such a manner to causing memory access to access a local or private cache, for good caching behavior, such that there is less pressure to evict data from the private cache. For example, result of each multiply operation may be stored in a location, where at least one result is stored in a location used to store a transformed data matrix which was the input to a prior multiply operation for that same task or block of tiles. The fact that writes may carry more weight with cache coherence policies may help prevent matrix results written to a private cache from being evicted. A process executed on a core may not directly decide what actually goes to main memory, but may act in a way that the processor's memory system tries to keep recently accessed data in the caches. A shared buffer embodiment may further choose parameters so matrices will most likely remain in the local cache, to avoid accessing the main or external memory, re-using the same space for input and output to give very important savings.

Figure 4:
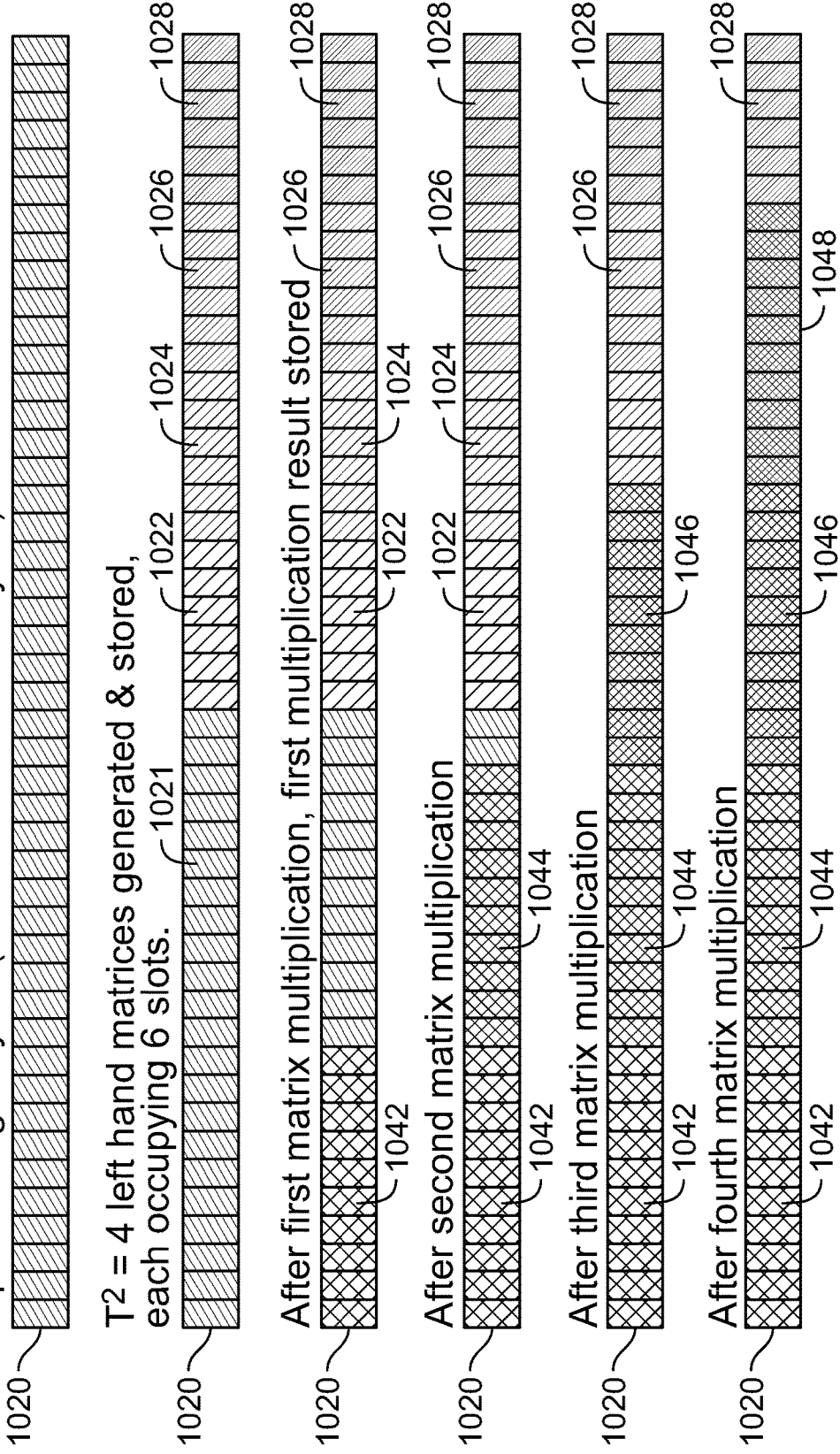
FIG. 4 is a diagram of a buffer or cache storage scheme according to embodiments of the present invention.

FIG. 4 is a diagram of a buffer or cache storage scheme according to embodiments of the present invention. Embodiments may allocate a shared memory buffer of size $T^2 \times Smax + Smin$ bytes, which may be sufficient to store $T^2$ matrices of size Smax and one more matrix of size Smin. Smax and Smin may be determined based on the sizes of left hand (data) matrices, typically of size R×Cin, and the sizes of output (multiply results) matrices, typically of size R×Cout. Smin may be the lower of (R×Cin) and (R×Cout) times the size of each element in bytes, and Smax may be the higher of (R×Cin) and (R×Cout) times the size of each element in bytes. In the FIG. 4, an example is shown where we consider the case when T=2 and each element is 4 bytes, Smin=6*4=24 bytes; Smax=10*4=40 bytes, and the shared buffer 1020 is represented by (T²*10+6)=46 slots of 4 bytes each: this is exactly the size to store 46 elements of size 4 byte each, or to store $T^2$ matrices of size Smax and one more matrix of size Smin. Buffer 1020 (shown repeatedly over time in FIG. 4) may fit "comfortably" in a cache private to a core, meaning buffer 1020 fits in the cache with extra room to accommodate other information which may be stored in the private cache. The buffer may be "shared" in the sense that different types of data, e.g. left hand matrices used for input to a multiply operation, and the product or result of that multiply operation, may share the buffer with no-longer-needed right hand matrix data overwritten by newly created product or result data. The shared buffer may be sized and accessed so that the cache policy of the processor including the relevant core stores the buffer in the cache private or local to the relevant core.

Left-hand matrices 1022, 1024, 1026 and 1028 are stored in the shared buffer as they are generated, such that the last entry of the last left-hand matrix is stored at the end of the buffer. The first result of the matrix multiply may be saved not in place of a left-hand matrix but rather in a blank or allocated space at the beginning (or at one end) of the shared buffer, not holding a left matrix. In some embodiments, the result does not overwrite the left-hand matrix used to produce the result because the matrix multiply operation may write a partial result and still need access to an input matrix. When all left-hand matrices are stored, buffer 1020 may have continuous "empty" space 1021 at the beginning. In example buffer 1020, there are 22 "empty" slots in the beginning at space 1021, followed by 6 slots of the buffer occupied for each left-hand matrix. The result matrices 1042, 1044, 1046 and 1048 are (after they are created) also stored in the buffer, but starting from the beginning. (Beginning and end are used as relative terms; in other embodiments other positions within a buffer or storage unit may be used.) In some embodiments as multiplications are performed, the memory locations used to store already multiplied left-hand matrices get overwritten by the result matrices, but a left-hand matrix that has not yet been multiplied is not overwritten. For example, in FIG. 4, the first result matrix 1042 is stored in the first 10 "empty" slots, while the third result matrix 1046 is stored in the 2 last "empty" slots, followed by 6 slots previously occupied by the first left hand matrix 1022 and the first 2 slots of the second left hand matrix 1024. In some embodiments, one (e.g. the last used) left-hand matrix is not overwritten, since the first multiply result may be written to a space not occupied by a left-hand matrix.

In some embodiments, the saving in the used memory in the core-private (e.g. L2) cache is significant, e.g. close to a factor of two when Smin=Smax. In the example in FIG. 4, it may be (72-40)/72=44.4%, and it may be higher for larger matrices). Thus some embodiments may store almost two times larger left-hand matrices than otherwise, leading to almost double computation per task, achieving almost double compute utilization.

In some implementations, it is impossible to perform inverse transforms before all matrix multiplications are performed, as it may require the results of all $T^2$ matrix multiplications. In prior art implementations, since the output of $T^2$ larger matrix-matrix multiplications cannot fit in a core-private (e.g. L2) cache, the outputs of a matrix multiplication would have to be re-read from the main memory or shared (e.g. L3) cache, with no guarantee that it would still be in the shared cache, making it hard to achieve good utilization. Embodiments of the present invention may improve on such prior art implementations and avoid this intermediate storage (and possibly, intermediate synchronization). The results of all multiplications may be smaller, and the cores can perform the inverse transforms immediately, as the results may be (e.g., completely, or mostly) be read from the local/core-private (e.g. L2) cache. This may be advantageous in a pyramidal approach where the cores can then even start the computation of the next layer on the data in their private cache, avoiding having to store the output of the previous layer (after inverse transform) in the main memory.

In a typical embodiment, each task performs multiplications by all $T^2$ kernel matrices, resulting in all $T^2$ values in each tile, and thus all pre-inverse transform tiles are completely computed and ready to be inverse transformed during the task being executed by the core.

Figure 2:
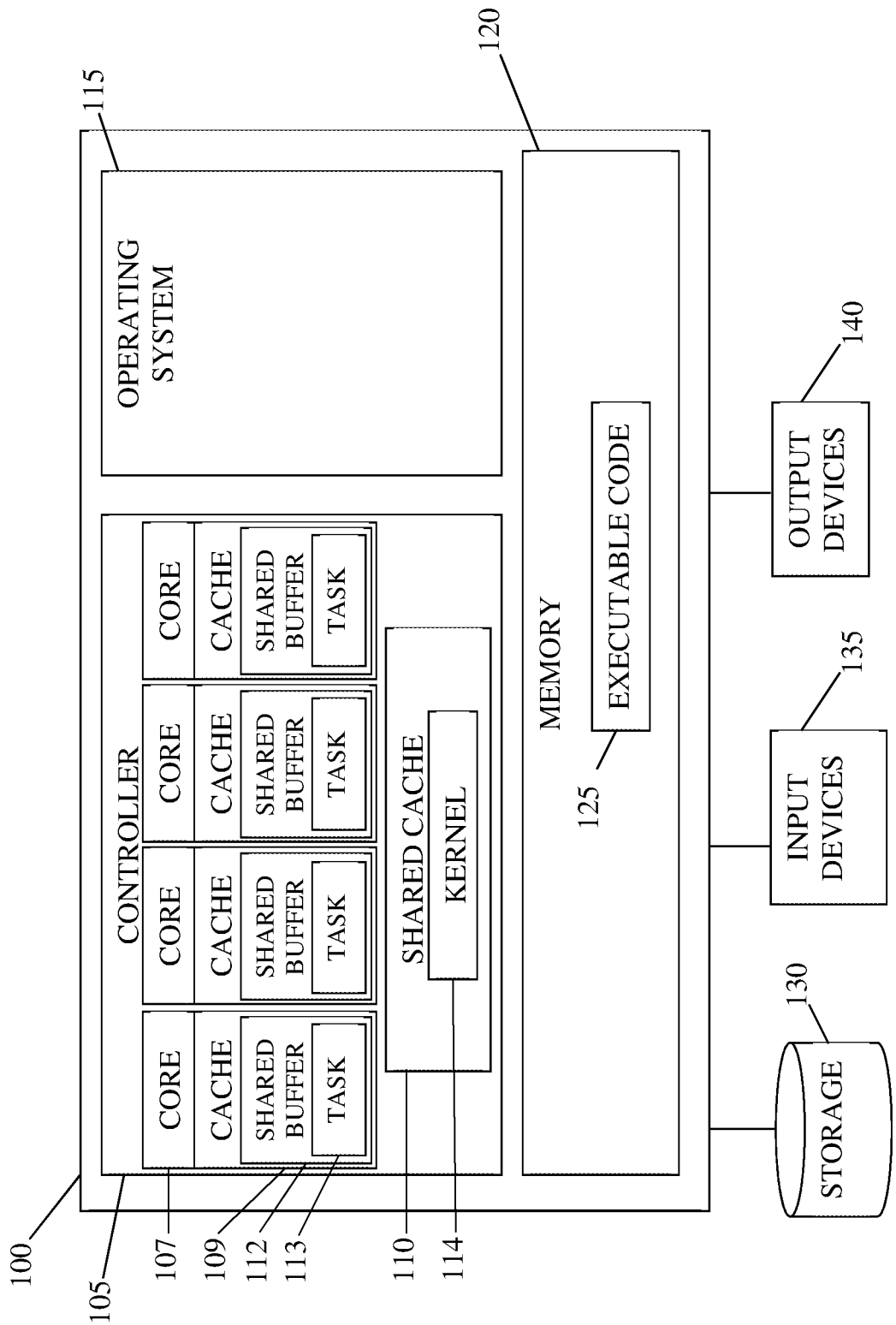
FIG. 2 is a high-level block diagram of an exemplary computing device which may be used with embodiments of the present invention.

FIG. 1A is a block diagram of a neural network according to an embodiment of the present invention. A NN such as NN 1 which may be operated on or computed according to an embodiment of the present invention typically uses thousands of neurons 5 and links 10. Typically the operation of NN 1 is simulated by software or code operating on a number of processors or cores; each processor may include more than one core, e.g. 4, 18, etc. NN 1 may input data as for example an input vector 11 of values (representing, e.g. a photograph, voice recording, or any sort of data), and may produce an output of signals or values, for example output vector 12. NN 1 may have neurons arranged into layers 7, each including neurons 5 connected to other neurons by links or edges 10. NN 1 may input data, for example an image (e.g. an input vector, matrix or other data) and may produce an output of signals or values, for example output vector 12, which may for example indicate the content of or a description of the image. Other input data may be analyzed, and other types of NN tasks may be performed. NN 1 may in one example have layers such as convolution, pooling, output layers, an FC layer, softmax layer, etc. Each layer may include neurons connected to other neurons by links or edges. The NN in FIG. 1A is typically simulated, and represented as data, for example by systems such as shown in FIG. 2, using code such as described herein. While specific numbers and types of layers are shown, FIG. 1A is merely a highly generalized example, and NNs used with embodiments of the present invention may vary widely as known in the art.

Figure 1B:
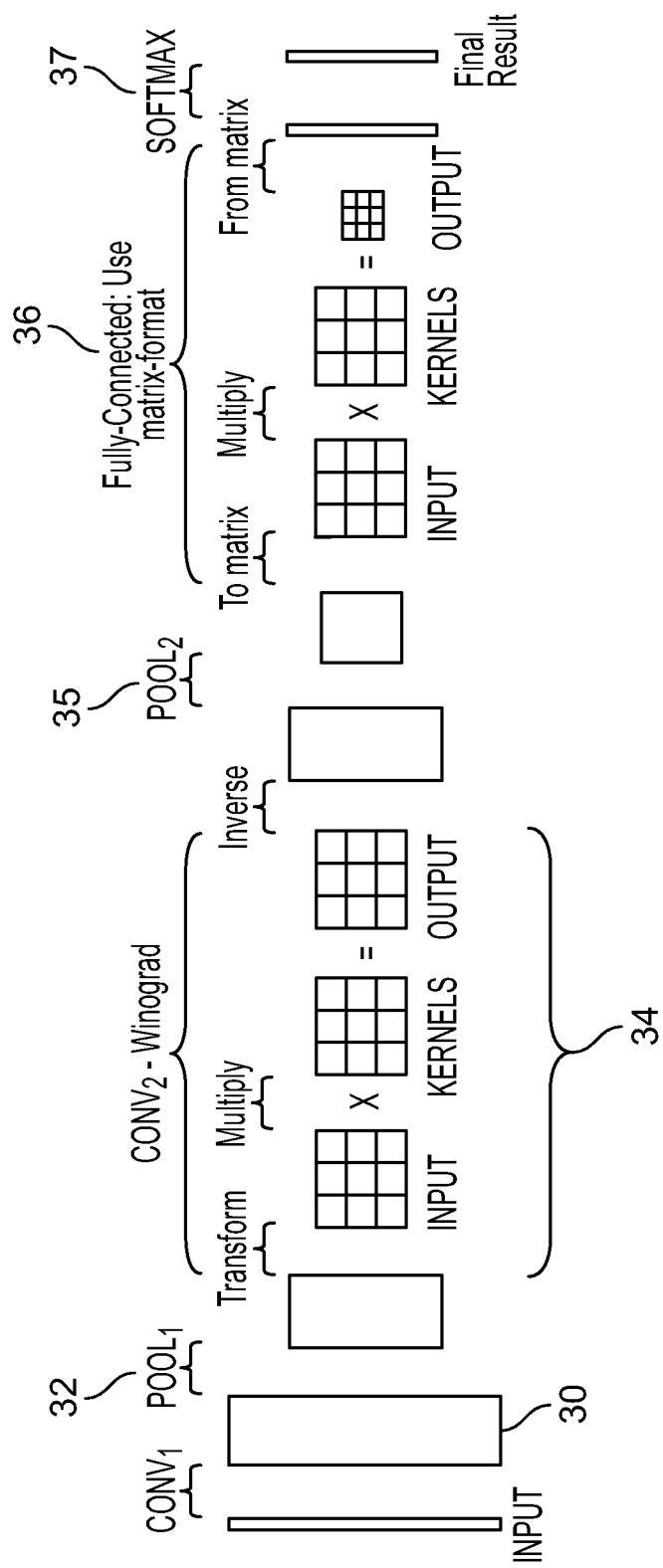
FIG. 1B is a block diagram of a neural network according to an embodiment of the present invention.

FIG. 1B shows an example of a CNN with a sequence of layers including convolutional layers. The NN includes direct convolutional layer 30, pool layer 32, and convolutional layer 34 using a transform-multiply-reverse multiply operation. Layer 35 may be a pool layer, layer 36 may be a transformed convolution, and layer 37 may be a softmax layer (softmax being a function that may be used in some NN layers). Some convolutional layers such as convolutional layer 30 may not use transforms, but other convolutional layers such as convolutional layer 34 may use transforms such as a transform-multiply-inverse transform process. While in some embodiments a fully connected later may use a transform-multiply operation, in some embodiments such a transform-multiply is not part of a task-division and "fusion" process as described herein. One or more cores or processors may process the NN during inference (e.g. run-time) by, e.g. simulating the activity and data flow of the nodes or neurons and layers, which may include matrix multiply, transform, and inverse transform operations.

FIG. 2 shows a high-level block diagram of an exemplary computing device which may be used with embodiments of the present invention. In some embodiments the computing device 100 of FIG. 2 may execute NN inference, using e.g. one or more processors such as processor 105, each of which may include multiple cores 107 (e.g. 4, 18, or other numbers), each such core having associated with it a private or local cache 109 (e.g. L2), accessible only by that core, and the multiple cores in a processor sharing a shared cache 110 (e.g. L3), the caches located typically within or as part of the processor on the same chip. Code as describe herein may execute a NN using known methods and including the matrix multiply and/or "pyramid" processing as described herein (e.g. modeled based on a combination of the examples in Tables 1-5 shown herein). Other caches, such as L1 caches, may be included. Although example embodiments are described in in terms of L1, L2, and L3 cache levels as in Intel architectures, embodiments apply to any architecture with a hierarchy of shared and un-shared cache levels.

As discussed further herein, tasks may be defined by sets of tiles of input data; for illustrative purposes each local cache 109 holds a shared buffer 112 holding a data which describes or is part of a task 113 (the local cache typically stores other data per the processor's cache policy). A set of transformed kernel data 114—typically all kernel data needed for a task, e.g. all the kernel data for a NN layer— may be stored in shared cache 110. While cores 107 may access task and kernel data via references to external memory 120, the manner and frequency of access of this data, and the size of the sections of data accessed, may cause the data to be kept in caches 109 and 110.

Controller or processor 105 may be or include, for example, one or more central processing unit processor(s) (CPU), one or more Graphics Processing Unit(s) (GPU or GPGPU), a chip or any suitable computing or computational device. Caches may be handled as is known in the art by a cache policy particular to the type or model of processor 105. Processor 105 may be one integrated circuit and cores 107 may be separate processing units each reading and executing program instructions. Thus a single processor 105 can execute different instructions or threads on different cores 107 at the same time, increasing overall speed for programs that support multithreading or other parallel computing techniques.

Computing device 100 may include an operating system 115, a memory 120, a storage 130, input devices 135 and output devices 140. Embodiments of the present invention, performing operations such as NN inference, may be executed by a device such as computing device 100.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as NN data, data describing a NN, NN kernel information, etc.

Executable code 125 may be any executable code, e.g., an application, a program, a process, task or script. Executable code 125 may be executed by controller 105 possibly under control of operating system 115. For example, executable code 125 may when executed cause the NN execution or inference, or matrix multiplication, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 including cores in processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the invention may divide or partition a complete CNN computation into smaller tasks, based on parameters chosen or computed based on a particular target processor's parameters. Each task may correspond to a portion of input, the size of which determines the amount of computation performed in the task. Tasks can be performed by different cores independently of each other, without any synchronization overhead other than initial task allocation. Embodiments may allow each core performing a task to compute the corresponding output of the convolutional layer (after the inverse transform) without accessing the main memory (other than reading the input). In some embodiments the $T^2$ matrices in step 2 described above (e.g. applying the convolution in the transformed space) can be kept in the shared (e.g. L3) cache while each core transforms a piece of the input and prepares a left-hand matrix (e.g. input data to a NN or layer) for each right-hand (e.g. kernel or filter) matrix. Each one of the $T^2$ right-hand matrices may be transferred from shared cache (e.g. L3) into a core-private (e.g. L2) cache once per task when required for the matrix multiplication, but typically does not stay in the private cache for long, only being accessed briefly. The output resides in the core-private cache while the next matrix is brought from shared to core-private cache and multiplied, etc. The result matrices can fit in the core-private cache, allowing the core to directly perform the inverse transformation. Typically right/kernel data is placed in a shared cache (but brought to a core-private cache for multiplication) and left/data in a cache private to a core.

Parameters may be determined before, such as tile size T of the transform, and $R \geq 1$, which is used to determine the amount of computation per task. The number of tiles in the transform may be derived from T and also the data and kernel sizes: thus in some embodiments a T is determined such that, when considering data input size and kernel size, a set of kernel matrices based on T fits in a shared cache comfortably, with room for other data.

The pseudocode described below in Tables 1-5 describes example methods for transforming and arranging "left" matrix, or input data (data input to the NN such as an image, or data flowing from one layer to the next).

Kernel or filter data, which may be considered right matrix data, may be transformed in a similar manner. For example, filters may be transformed ahead of time (prior to inference) to have tile size $T^2$ and may be transformed into $T^2$ matrices of size Cin×Cout. Right-hand matrices, e.g. kernel or filter matrices, may be precomputed prior to inference or run-time by transforming and appropriately padding the original convolutional kernels, and used for different inputs. There is typically no need to re-compute kernel matrix data at each inference if it is used in a NN repeatedly used across different input data.

Inputs to a NN may be for example an image to be categorized, speech data to be analyzed, etc.; inputs to layers may also be intermediate values sent from a previous NN layer which is to be processed using matrix multiply operations. An input channel, e.g. input data, or outputs from a prior NN layer, may be divided into tasks. Typically, NN input, whether input data to a NN or output from one layer which is input to the next layer, is divided into channels, e.g. R/Y/B or outputs from NN filters. Tiles may be created from input data based on the parameter T (e.g. forming AllTiles below); e.g. the grid of input data may be divided into typically overlapping squares or tiles for processing, where the size of tiles is T×T. The number of tiles in AllTiles may be, computed for example using a formula. For example, if the input data or image is two-dimensional, and the input data or image is of size Xdim×Ydim, then number of tiles may be (Xdim−Kx+1)/T×(Ydim−Ky+1)×B, where B is the batch size, and kernel dimensions are Kx by Ky. The batch may be the number of images or data sets processed by the NN at once.

Example pseudocode which illustrates an embodiment of dividing or breaking down input data may be for example as shown in Table 1:

TABLE 1

AllTiles = tiles of size T×T in the first input channel (from the corresponding B × D1 × D2 input)
CoreTiles = AllTiles partitioned into blocks of R tiles (for simplicity, it can be assumed that the last block is padded by tiles of zeros).

or filter) matrix. Each one of the $T^2$ right-hand matrices may be transferred from shared cache (e.g. L3) into a core-private AllTiles may be all input data, partitioned into tiles of input data each tile having dimension T×T. Neighboring tiles may have overlaps (e.g. of size k−1 where k is the size of kernel; in an example where a kernel for each filter is 3×3, the overlap may be 3). The parameters T and R may be chosen or calculated as described herein elsewhere. In a typical embodiment, tasks are divided, and within a processor any available core, according to the processor's scheduling regime, may take the next available task. Each core takes a task and performs a transform-multiply-inverse transform for the task. In the pseudocode in Table 1 only one input channel is considered, since when a core takes a tile for a certain input channel it will take input data for all other channels as well. Thus the pseudocode in Table 1 effectively deals with all input channels, as a core will as a matter of course deal with all input channels according to the task (tile) division it is given. CoreTiles may be X groups or blocks of R tiles each. A tile as used in the pseudocode of Table 1 may be a specific region of input data. A task may be a group or block of tiles which are then processed using the transform-multiply-inverse transform method; a task may also refer to the operation of processing such a group or block of tiles.

The number of tiles and tile size for kernel/filter data is the same as that of input data. Due to the sizing of kernel data using T, which is dependent on the target architecture, access to kernel data in main memory should, in specific implementations, cause the kernel data to fit entirely within a cache shared by the cores of a processor. Kernel data may be stored compactly to make it easier to load, when needed, to caches private to cores. Kernel data may be stored continuously in a shared cache and not broken up.

In one embodiment, the number of tiles is based on T and the input data size and kernel size. The number of left hand (data) matrices is typically T×T, and the number of right hand (kernel) matrices is typically T×T; this is typically because one matrix is used per tile data location. The number of tiles for data and kernels is typically different from the number of matrices. The dimensions of each kernel matrix is Cin×Cout; and the dimensions of each data matrix is Cin×R.

The computation in each task can be represented in the following three-stage way, according to the sample pseudocode in Table 2. During the transform stage, matrices may be transformed using for example a fast Fourier transform or Winograd transform, before being multiplied.

TABLE 2

For TileBlock in CoreTiles: // TileBlock is the block picked by the given core, defining its next task. Each core choses or has chosen for it a task defined by TileBlock, a group or block of R tiles
   for i from 0 to R-1: // one by one pick a tile in TileBlock
   Spectrum = tiles aligned with TileBlock[i] along the channel dimension (Cin tiles dimensioned T × T) // Capture tiles in other input channels in same position as TileBlock[i]
   Transformed = transform each tile in Spectrum (Cin transformed tiles of size T × T)
SameLoc[i] = reshuffle Transformed into $T^2$ vectors of size Cin each.

In the pseudocode in Table 2, the last line may reshuffle the tiles such that the tiles may be viewed as rows, $T^2$ vectors of size Cin each. Cin is the number of input channels and Cin is the number of output channels, and:
   SameLoc[i][j][k] may be created where:
     i goes to R
     j goes to T2
     k goes to Cin
SameLoc may be defined as a three-dimensional matrix of "sandwiched tiles". If the first dimension is fixed, SameLoc[i] is a two-dimensional matrix storing the transformed data of TileBlock[i] (i-th tile in TileBlock). If the second dimension is fixed, SameLoc[i][j] corresponds to one of the $T^2$ locations in the i-th tile in TileBlock (in particular j-th location). Thus SameLoc[i][j] may be a vector of Cin elements, containing transformed inputs in all channels at the j-th location in tiles aligned with the i-th tile in the TileBlock. SameLoc[i][j][k] may then be a value at the j'th location and k'th channel of transformed i'th channel in TileBlock.

The left matrices for the next matrix multiplication step can be constructed or organized per the following example pseudocode in Table 3. The example pseudocode in Table 3 may build matrices to multiply. LeftMatrices may be the same 3 dimensional matrix as SameLoc, but with the dimensions were ordered differently (e.g. first and second exchanged). For example, there may be $T^2$ LeftMatrices each with dimensionality R×C_in. Mathematically, for 0<=i<R, 0<=j<$T^2$ and 0<=k<C_in, LeftMatrices[j][i][k] =SameLoc[i][j][k]. Example pseudocode is in Table 3:

TABLE 3 for i from 0 to (R-1)
for j from 0 to ($T^2$-1)
for k from 0 to (C_in-1)
LeftMatrices[j][i][k] = SameLoc[i][j][k]

In the pseudocode in Table 3, i from n to m means i goes through all numbers n, n+1, . . . , m−1, m, arrays are zero indexed, and the i-th row of LeftMatrices[j] is the vector SameLoc[i][j].

In the above example, SameLoc and LeftMatrices have the same size and contain the same data. Since only LeftMatrices are needed in one implementation for the next stage of the computation, SameLoc in such an implementation never actually needs to be stored. In fact, a transform function as described may directly write each transformed input to the location in LeftMatrices where it belongs (thus transform and reshuffle, e.g. taking data and storing it in a different order, or having code access it in a different order, may be performed together), avoiding excessive intermediate storage. Memory allocation and layout of LeftMatrices may be using a mechanism for re-using memory (and thus cache, due to the target processor's cache policy), such as demonstrated in FIG. 4. In such an embodiment, LeftMatrices may be stored contiguously at the end (or one end) of a preallocated buffer of a larger size, parts of which may be overwritten by the results of matrix multiplications in the next stage. Memory allocation—organizing how main or external memory is accessed—in some embodiments affects the extent that data is stored and kept in cache, without being evicted. Thus embodiments performing memory allocation may aim to keep some data in cache as much as possible.

In a matrix multiply stage, for each 0≤j<$T^2$, LeftMatrices[j] is multiplied by a right-hand matrix M[j] with dimensions CinxCout to obtain the results of the convolution in the transformed space. The right-hand matrices (e.g. kernel matrices) may be precomputed by transforming and for example appropriately padding the original convolutional kernels (CinxCout of them), and then re-shuffling them to model point-wise multiplications as a series of vector matrix multiplications. Re-shuffling in this context may mean storing transformed kernels in a way that is suitable for the intended computation. For example, there may be CinxCout kernels having a certain dimension prior to transform, which after transform becomes dimension $T^2$. Instead of storing data as CinxCout by T×T, an embodiment may store the data as $T^2$ matrices each CinxCout (or $T^2$×CinxCout).

There may be one such matrix for each one of the $T^2$ tile locations, and the same $T^2$ matrices are used in every task (for every block of tiles). Pseudocode for the matrix multiply stage may include for example per the following example pseudocode in Table 4:

TABLE 4

For j = 0 to $T^2$-1:
   SameLocOut[j] = LeftMatrices[j] (matrix-matrix multiply) M[j]. // The result of the matrix multiply, SameLocOut[j], is saved to the shared buffer. In the case where Cin=Cout, it is saved in exactly the spot held by the previous LeftMatrices (and the first SameLocOut is saved to a space at the beginning of the shared buffer not holding a left matrix). In general, SameLocOut[j] may be stored in shared buffer and occupy some amount
of contiguous space before the space where LeftMatrices[j] is stored.

M[j] is typically a righthand or transformed kernel matrix stored in a shared (e.g. L3) cache after being loaded from external memory typically once. Embodiments of the invention may operate to ensure the right hand matrices (e.g. M[j]) fit in a shared (e.g. L3) cache and also align in an efficient manner. Frequent shared cache access may help ensure that the data stays in cache and is not retired to memory. The right hand/kernel matrices may be stored in the cache shared by cores (e.g. L3) because a) they are designed based on the parameters to fit within the L3 cache, typically with room for extra data possibly not relevant to the matrix multiply; and b) they are used repeatedly and contemporaneously by a number of different cores, all multiplying different left hand matrices by the same right hand matrices.

Embodiments describe storing certain data in a shared cache and certain data in a private cache. It is intended that in which cache data is stored is not under the direct control of code or instructions according to embodiments of the present invention, but rather is caused by such code or instructions in conjunction with the particular (target architecture) processor's cache and memory policy. This is accomplished, as described herein, by sizing and structuring data in such a way that it will fit and will be likely to be kept in the relevant caches.

Figure 5:
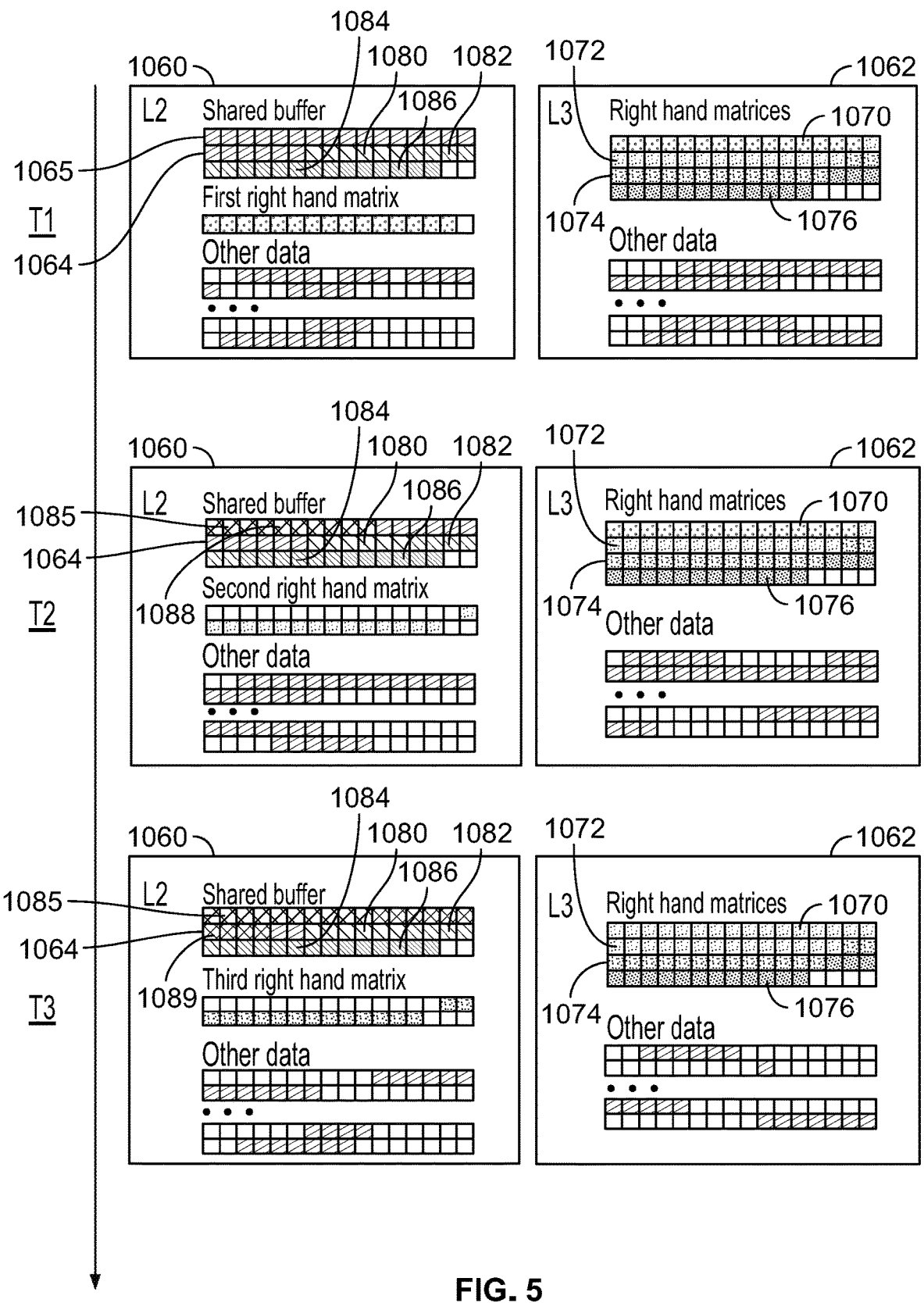
FIG. 5 is a diagram of a buffer or cache storage scheme according to embodiments of the present invention.

FIG. 5 is a diagram of a buffer or cache storage scheme according to embodiments of the present invention. In some embodiments, the right/kernel M[j] matrices may be stored in the shared (e.g. L3) cache, incorporating improvements described herein and illustrated in the example of FIG. 5. While the total memory required for matrices is typically too large for private or local (e.g. L2) caches, embodiments may choose parameters such that the kernel matrices comfortably fit, at the same time, in the shared or common cache. Embodiments may generate the M matrices and store them contiguously or linearly in memory and align the data in each M[j] at the cache line boundaries to have a good caching behavior (an example of which is described in FIG. 3).

In FIG. 5, the contents of caches are illustrated at different points in time T1, T2 and T3 during the matrix multiplications. On the left-hand side are shown the contents of a cache 1060 local or private to a core (e.g. L2 cache), while on the right hand side are shown the contents of a cache 1062 shared by or common to multiple cores in a processor (e.g. an L3 cache). Right-hand matrices (typically all) are stored (e.g. with a continuous memory layout) and accessed from shared cache 1062. Four example right-hand matrices (other numbers may be used) 1070, 1072, 1074 and 1076 are shown stored. Shared cache 1062 also contains other kinds of data which changes throughout the computation, but the right-hand matrices 1070-1076 remain cached throughout times T1-T3 (further time periods not being shown, for clarity), as shown in the FIG. 5

Shared buffer 1064 (an example of which is described in FIG. 4) is stored in and accessed from a local private cache 1060 (each core typically having exclusive use of a separate private or local cache). The result matrices of the matrix multiplication, e.g. SameLocOut[j] for j=0 to $T^2$−1 are also stored, typically contiguously, in the same memory buffer that stores LeftMatrices, starting from the one end (e.g. the beginning) of shared buffer 1064. Other data such as a recently used right hand matrix may be stored in private cache 1060. Shared buffer may have an empty or blank space 1065 in which the result of the first matrix multiply is placed, as in some embodiments the first matrix multiply in a task does not replace a left/data matrix. In some embodiments, the result of the first matrix multiply may fill up precisely the empty space when Cin>=Cout. In other cases, several earlier multiply results may fit in the empty space in the beginning (e.g. space 1021 in FIG. 4).

In FIG. 5, T (or a parameter describing how to divide data and kernels into tiles)=2, and four left-hand matrices, LeftMatrices, 1080, 1082, 1084, and 1086, are shown across time, as are two of the result matrices, SameLocOut, 1088 and 1089 (only two multiply operations are shown for clarity). At different points in time T1, T2, and T3, during the matrix multiplication stage, cache 1060 stores different right-hand matrices—in particular, the right-hand matrix used in the ongoing multiplication is brought to cache 1060 from cache 1062 (right-hand matrices used in previous multiplications may eventually be evicted). For instance, when the first left-hand matrix 1080 (e.g. LeftMatrices[0]) is being multiplied by the first right-hand matrix 1070 (e.g. M[0]), this right-hand matrix is brought to cache 1060. Then, the result matrix 1088 (e.g. SameLocOut[0]) is stored at one end (e.g. in the beginning) of the shared buffer or cache 1062. While results 1088 and 1089 in FIG. 5 do not replace any of matrices 1080-1086, further multiply operations may replace at least some of matrices 1080-1086. Similar to the shared cache, the cache lines in cache 1060 that do not store the shared buffer or the right-hand matrix may contain other data that changes throughout the computation (e.g. previously loaded right-hand matrices, other variables used in multiplication, etc.).

When multiplying by the $T^2$ matrices M[j] from cache 1062, an embodiment may generate $T^2$ pieces of the output SameLocOut[j]. In one embodiment it is important that the first part of output SameLocOut[0] remains in cache 1060 at the point in time when the last piece (e.g. in one embodiment SameLocOut[$T^2$−1]) is generated. Otherwise, subsequent computation may need to read SameLocOut[0] from main memory. $T^2$ products of left-right matrices are generated, all of which have to be computed for the inverse transform to be able to start. If the first product generated was evicted by the time last one was computed, a process would have to re-read from main memory, which is slower than cache access. Thus some embodiments may increase the likelihood that, or ensure that as the M[j] matrices are brought or transferred into cache 1060 to perform multiplication, they do not evict or cause eviction of the older pieces of output, e.g. part of the shared buffer (in one embodiment each M[i] will fit a local or private cache 1060, but cumulatively, they may not). Note that since the pieces of output are being written, but matrices in M are brought into cache 1060 only for reading and in some embodiments may have linear memory alignment, the cache coherence system (e.g. the policy effected by the processor) should generally keep the output in cache while evicting older matrices as necessary. However, if needed an embodiment may reinforce this behavior by selectively "warming up" the cache lines that contain earlier pieces of output by reading them (making these result matrices more "recently read" than the M matrices that were read prior to that point).

An inverse transform may be performed, for example per the example pseudocode in Table 5. In Table 5, SameLocOut may contain a matrix for each tile location with size R×Cout, where Cout is the number of output channels. SameLocOut[j][i, k] may be the transformed output value at the j-th location of the tile in the C_k-th channel among all tiles aligned with the i-th tile in the TileBlock.

TABLE 5

ReshuffledOut = reshuffle SameLocOut to R × Cout tiles of size T × T.
SpectrumOut = apply inverse transform to each tile in ReshuffedOut SpectrumOut[i] may contain the output for all Cin tiles aligned along with TileBlock[i], e.g., for 0≤i<R and 0≤k<Cout, SpectrumOut[i][k] may be the output T×T tile in the k-th channel aligned along the i-th tile in TileBlock.

Embodiments may choose certain parameters, in particular T (e.g. determining a division of input data and kernels into tiles) and R (e.g. a division of data into groups of data to be processed, or "tasks", e.g. the granularity of the work done by each core). Various requirements may be considered. For instance, tile size in a Winograd transform is often taken to be no more than 8, to avoid potentially significant losses in accuracy. It is may be important to have the granularity of tasks such that there are more tasks than available cores in the target architecture (ideally, a few times more). In some embodiments, certain requirements should be observed, generating certain parameters, although in other embodiments other or different requirements may be used:

1. Requirement 1: $T^2$ matrices (e.g. right-hand or transformed kernel matrices) which result from a tile size of T, and the known kernel size, should comfortably (e.g. with 25-50% left over for other data to be stored in the cache) fit in the shared cache (e.g. L3);
2. Requirement 2: A parameter describing how to break up tiles into groups or blocks for tasks (e.g. R) should be large enough such that the amount of time required for the matrix-matrix multiplication offsets the time for reading the right matrix from the shared cache (since R affects the amount of computation in the matrix multiplication but not the size of the right-hand matrix). Equivalently, the requirement may be that the arithmetic intensity is larger than the compute-to-memory ratio at the shared cache level, or that the arithmetic intensity is large enough in comparison to the compute-to-memory ratio;
3. Requirement 3: A shared buffer (typically holding left/data matrices for a task and the multiply output for that task) should comfortably fit in the dedicated (e.g. L2) cache of each core, typically when tiles are sized and divided for individual tasks to be executed by one core. To effect this, R may be chosen or determined such that the amount of data used by the left-hand (data) and product or result matrices takes a portion of approximately 50%, 25%, or another number of the local or dedicated cache. Other portions may be used.

The above requirements are based on matrix sizes, determined from, among other data, the number of tiles and tile size. In one embodiment, the number of tiles may be (X_dim−Kx+1)/T times(Ydim−Ky+1)/T times (Z_dim−Kz+1)/T times batch_size, as discussed elsewhere, in other words: the number of tiles is based on T and the known input data size and kernel size. Thus known parameters for choosing T and R include the target architecture (and its cache size), input data size for the particular layer to be calculated, and the kernel size for that layer. The number of left hand (data) matrices is typically T×T, and the number of right hand (kernel) matrices is typically T×T; this is typically because one matrix is used per data location within a tile (a tile having a size T×T and thus T×T data items/locations). The dimensions of each kernel matrix are Cin×Cout; and the dimensions of each data matrix are Cin×R. To determine if matrices will fit in a shared cache, it is assumed in one embodiment that T×T kernel matrices of dimensions Cin× Cout are to fit in the shared cache, with some extra room needed for other data which will be placed in the cache. To determine if matrices will fit in a private cache of a target architecture, it is assumed in one embodiment that T×T data matrices of dimensions Cin×R are to fit in the private cache (note the number of tiles per each task, AllTiles/R, may differ from the number T×T of matrices to fit in the private cache), with some extra room needed for other data which will be placed in the private cache, including for example kernel matrices which might be placed in the private cache during multiplication. To compute the required size for storing these matrices, it may be assumed that the T×T data matrices and T×T matrix multiply result matrices are stored in a shared buffer. The number of tiles is typically not the same as the number of matrices, except if by chance.

The guidelines or requirements above are based on a target architecture (the specific processor for which the code is designed) and the parameters of that architecture, such as the size of the private and shared caches, and the data and kernel size for the target NN layer. While the three guidelines are described as "requirements", in certain embodiments not all guidelines or requirements may be used, and the "requirements" may be relaxed, or not adhered to strictly. Data should in some embodiments fit comfortably in the cache to minimize the risk of eviction, because there is typically data other than the matrices used for the multiply-transform-inverse operations in the cache. Among values that satisfy all these constraints, an embodiment may select or use those that minimize the total computation time. Since the second requirement above (R) should cause the task to be compute bound, this is equivalent to minimizing the overall amount of computation (e.g. measured in FLOPS), which depends on T and R as these parameters determine the overlap, the output size, and the amount of padding required to divide the whole input into pieces of required size. Finding the optimal parameter setting is then an optimization problem that can be solved during a planning phase, which can determine computation and creation of tasks.

If no values satisfy all hard constraints, then there are no T and R that would make each task completely compute bound. However, embodiments of the invention may still be worthwhile. One requirement may be that that $T^2$ matrices fit in the shared cache of the processor. However, the second and third requirements may be relaxed. Instead, for any given R and T, the resulting compute utilization may be determined which will be less than 100%. This can be because the matrix-matrix multiplication has less FLOPS than necessary (e.g. relaxing the second requirement by taking a smaller R than dictated by the second requirement) or if some intermediate data does not fit in the dedicated (e.g. L2) caches and should be (e.g. partially) stored and fetched from the shared (e.g. L3) cache (e.g. relaxing the third requirement by taking a larger R than dictated by the third requirement). If fixed values are considered for T and R, all the parameters of the algorithm can be implied the resulting arithmetic intensity can be estimated, and consequently the utilization may be computed based on the CMR of the shared cache of the target architecture: memory utilization of the shared cache (and in general, for each level of memory hierarchy, be it the main memory or the private caches) can be computed as the achieved arithmetic intensity (for the data brought from shared cache, e.g. right hand matrices) over the CMR of the shared cache. Arithmetic intensity larger than CMR corresponds to 100% utilization being achievable. Similarly, for a given target architecture, an embodiment can estimate the total computation time for the fixed values of T and R, such as by the formula described in "Revisiting Winograd- and FFT-Based ConvNet: A Theoretical Analysis and Empirical Comparison", Aleksandar Zlateski et al. Embodiments may also solve an optimization problem and find T and R that minimize the total computation time.

Embodiments may consider several concrete memory requirements to achieve good compute utilization on a processor. One requirement, e.g. "Requirement 1", may be data fitting into a shared (e.g. L3) cache of a processor. In some implementations, a shared cache can contain about 1-2 MB per core (e.g., on some Intel processors 1.375 MB for an AVX512 processor and 2.MBb for an AVX2 processor), while the $T^2$ right-hand matrices may require $4 \times Cin \times Cout \times T^2$ bytes altogether. A parameter T may be calculated or defined which governs the tile size of the transform, which in turn govern the amount of matrix data needed to fit in the cache shared by all cores in a processor.

A second requirement, e.g. "Requirement 2", may be termed "Compute Utilization". The number of FLOPS to perform the matrix multiplications after the transform is $2 \times R \times Cin \times Cout \times T^2$ (the computation of transforms may be ignored because they are typically negligible in comparison to the multiplications; this allows evaluation of the performance conservatively). The amount of memory that is streamed from shared L3 cache may be $4 \times Cin \times Cout \times T^2$, where it can be assumed that 4 is the number of bytes for a floating point number (for other computing precisions, the computations would need to be modified). This gives a CMR of R/2. In other embodiments, the assumption that 4 is the number of bytes for a float may be different.

In one embodiment, an algorithm should have a CMR of at least 10 for the AVX512 processor and 4 for an AVX2 processor in order to achieve full utilization (and not be blocked on fetching data from the shared cache). Other models of processor may use different parameters. In some embodiments actual requirements may be are a bit lower, but one may take a conservative estimate also because the performance seems to degrade as more of the shared cache is utilized (presumably caused by a hash function choice). Hence, if one performs a portion of the algorithm in isolation (e.g. not using a "pyramids" process as described elsewhere herein), for a target AVX512 processor an embodiment may require R≥20, and for the AVX2 processor an embodiment may require R≥8. (In an embodiment where "pyramids" is used, this requirement may be relaxed).

For the main memory of some architectures, the CMR requirement is roughly 3 times higher than for the shared cache, and one may use the estimate of 30 as CMR for the AVX512 processor and 12 as CMR for the AVX2 processor. However, during the operations using the shared cache an embodiment may not require access to main memory unless the input comes from the main memory or the output is required to be written to main memory. This may not be the case as often as one would expect when using "pyramidal" tasks.

If such a requirement is given for the input or the output, it may apply to both embodiments of the present invention and prior art methods, so embodiments of the present invention may not get any competitive disadvantage (and would still keep its advantages over other approaches for all the transformed computation that generates the output of the convolutional layer from the input). In some embodiments, the compute utilization may be estimated under such requirements. The size of the input is $4 \times R \times T^2 \times Cin$, the size of the output is $4 \times R \times T^2 \times Cout$, and the matrix-matrix multiplication has $2 \times R \times Cin \times Cout \times T^2$ FLOPS (one can ignore the computation in transforms, which is much smaller). Hence, if the input were to be read from the main memory, the compute utilization at the main memory level may be Cout/2, and if the output were to be written to the main memory, it may be Cin/2. If both were the case, then one may use an estimate of min(Cin, Cout)/4 for the compute utilization. There are other details that may be taken into consideration when inputs are read from or outputs are written to the main memory, in order to actually get a good compute utilization.

Requirement 3 is that the shared buffer should comfortably fit in the dedicated (e.g. L2) cache of each core: the shared buffer should fit along with other data that might need to be in the dedicated or private cache. While the shared buffer, as with other data described herein, is addressed by the core as if it were in external memory, processors naturally cache recently and frequently accessed data, and thus with proper sizing and accessing, the data should be stored in a cache. Thus R should not be arbitrarily large. Because a core of a process should keep the transformed tiles in its private cache, as well as the result of the multiplication (which is then inverse transformed), a naive scheme might require $4 \times R \times Cin \times T^2 + 4 \times R \times Cout \times T^2$ bytes to fit in a private cache of a certain size. To avoid evictions and allow for other required data to also fit in the private cache, an embodiment may be conservative and require this amount of bytes to fit in half of the private cache.

The shared buffer embodiment discussed elsewhere may reduce the memory requirement to $4 \times R \times T^2 \times max (Cin,$ Cout)+4×R× min (Cin, Cout) bytes. This amount may be upper bounded by 4×R×max (Cin, Cout)×($T^2$+1) which may provide for a simpler formula and an overestimation. Embodiments using a shared buffer, explained simply when Cin=Cout, may show an improvement in that once the first output is computed, the first input is no longer required. Hence, the second output can be written in place of the first input, the third output in place of the second input, etc.

The size of the local cache private to or dedicated to each core (e.g. L2) cache size is 256 KB=262,144 bytes for the AVX2 processor, and 1 MB=1,048,576 bytes for the AVX512 processor. Other specific processors or target architectures may be used. Using the upper bound, R×max(Cin, Cout)×($T^2$+1 should be at most 65,635/2=$2^{15}$ bytes for an AVX2 type processor and at most $2^{17}$ bytes for an AVX512 type processor.

Embodiments may consider 4×Cin×Cout bytes for the right-hand matrix used in multiplication. However, for some modern processor architectures, R will typically be at least 8 (e.g. 16 for AVX512), T will typically be at least 7, and the maximum number of channels (e.g. the greater of Cin and Cout) for which an embodiment can be efficient may be 64 (or 128 for an AVX12 type processor). Hence, 4×Cin×Cout is much smaller than 4×R×max (Cin, Cout)×($T^2$+1) (for storing which it may be only required half of the private cache).

For efficient matrix multiplication, it is desirable to have R≥8 for the AVX2 type processor and R≥16 for the AVX512 type processor. Given all these requirements, settings of parameters for which an embodiment is applicable even in isolation (e.g. without a pyramids embodiment) may be found. For an embodiment using the Winograd transform, T is typically in a range from 4 to 8. Larger tile sizes are usually desired because they reduce the overlap between tiles: for example every two neighboring tiles may overlap by Kx-1 elements in an x dimension (similarly in y and z dimensions where Kx, Ky, and Kz are the dimensions of the kernels), the data elements in overlaps may contribute to computations in more than one tile. Using larger tiles implies having less total number of tiles, and less data elements in the overlaps of the neighboring tiles. On the other hand, for Winograd transform, using tile sizes larger than 8 typically leads to numerical stability issues, and hence, using tile size 7 or 8 is usually an optimal choice.

As per the formulas described herein, larger tile sizes lead to larger memory size for data which it is desirable to fit in the private (e.g. L2) caches of each processor and the shared (e.g. L3) cache (both of these grow as $T^2$ grows). In the following, we consider T=8 which is the largest typical choice for the tile size (and hence providing strictest constraints on the amount of data to fit in the caches). For the AVX2 type processor, this may provide max(Cin, Cout)≤($2^{15}$/(8×65)≈63. However, 64 input and output channels may work well if other estimations are conservative (e.g. requirements for half of private cache, upper bound on buffer size, tile size of 8 vs 7). For the AVX512 type processor, this gives max(Cin, Cout)≤($2^{17}$/{20×65)≈101. It is possible that 128 channels might still work if conservative estimations are used. This may work if for example 63% of the private cache is used instead of half, or if a tile size of 7 is used (which gives max(Cin, Cout})≤133).

Alternatively, if the number of input and output channels is 64, an embodiment may use a Fourier transform (which may require tile size of at least 16) using an AVX512 architecture, assuming that 63% of the private cache can be used for the matrix aspects of the computations (A Fourier transform may not have numerical stability issues, but may be less efficient than Winograd for smaller tile sizes.).

Memory requirements on the shared cache on some architectures may be 4×Cin×Cout×$T^2$ for when max (max (Cin, Cout) is 64, e.g. 1 MB. Given that the size of the shared L3 is 1.375 MB per core on the AVX512 architecture, and for 4 cores this is about 18% of available memory. For the AVX2 architecture, where the size of the shared cache is 2.5 MB per core, it is 20% of available memory even for 2 cores. Note that typical number of available cores is much higher, which would allow for tile size 16 in Fourier transform or 128 channels.

Computations may also apply and work even better for complex transforms, e.g. when the data is a complex number, represented by a pair of floating-point numbers instead of a single floating-point number. In that case memory requirement, may be approximately speaking, unaffected (each value may be a pair, but because of symmetry, only $T^2/2$ transforms are required leading to half as many matrices). The amount of computation, however, is multiplied by two, as there are four multiplications to perform for a pair of floats now instead of one multiplication, which is two multiplications per floating-point number instead of one. Hence, the overall arithmetic intensity to work with is actually twice better in the complex case.

Embodiments of the present invention when used with pyramid processing, especially in intermediate layers that have previous layers that add compute, can ease such requirements even further and allow working with a larger number of input and output channels. Some example embodiments may be combined with a pyramidal processing approach used with two very popular NN network architectures, VGG (e.g. VGG19) and Residual Neural Network ("ResNet", e.g. ResNet50), but may be used with other NN architectures, and deeper versions of these networks and settings. In one embodiment, after a set of inverse transform operations are performed on the results of the multiply operations for a layer, a transform-multiply-inverse transform may be performed for a portion of a next NN layer (if that layer is also a convolutional layer for which doing the transformed computation makes sense). For that next layer, a portion of the results of the inverse transform operations from the prior layer may be partitioned into a set of tiles, and the tile set may be partitioned into blocks of R' tiles each: R' is typically different from the R' used for the prior layer, and a T' may be different from the T used for the prior layer. For each block of R' tiles in the next layer, a core may perform a set of transform-multiply-inverse transform operations. In a "pyramid" embodiment, a process may not wait for all inverse transforms to be performed for a layer before proceeding to the next layer.

Pyramid processing embodiments may execute the layered graphs defining CNNs on multicore CPUs that typically have large caches and low memory bandwidth. Pyramid embodiments may divide computation into tasks in a manner that can be agnostic to the layered structure of the network, breaking the whole network (or substantially the whole network) down into asynchronously executable "pyramid" shaped tasks that can cross layer boundaries. Each task can be executed by a single compute core, encompassing a part of the computation that can optimize the cache and/or compute capabilities of this individual core. One benefit of this approach can be to reduce the amount of data brought to memory at any given time so that it can be proportional to the total amount of core cache memory, rather than the size of a given network layer. Another benefit of this approach can be that it can also turn computations that are memory bound into ones that are compute bound for the most complex convolutional transforms and computations. This can speed up the execution of CNNs on CPUs considerably because, for example, it can allow them to overcome their inherent limited memory bandwidth. Element-wise computations in a CNN can be ones in which the inputs needed to compute a given output value typically do not overlap with the inputs required to compute any other output value.

Unlike prior methods, a pyramid embodiment (and its resulting savings) may be applied to all (or substantially all) types of computation in a CNN, and in particular to non-element-wise operations such as those in convolutional layers and/or convolutional layers performed via FFT and/or Winograd transforms. Other types of transforms may be used. Embodiments may execute the tasks efficiently even though they may overlap with one another in the computations they perform. This can allow an asynchronous execution of a complete CNN, in training and/or inference modes. Pyramid embodiment processing may break with traditional or prior art GPU style executions of such networks, which, apart from fusing the computation of a few types of element-wise layers (such as pooling and ReLU), are typically based on executing the computation layer after layer with multiple cores executing a complete layer in a synchronous or bulk-synchronous fashion. Moreover, unlike prior approaches, the computation of some embodiments, within each pyramid task, can allow maximizing cache buffer reuse and/or reduction of memory bandwidth traffic, which can allow great savings in the amount of overall memory that needs to be used at any given point in the computation (e.g. a process may not need to store a whole layer's data in memory at the same time). This property can be a critical component enabling efficient execution of sparse CNNs.

A pyramid embodiment can execute a CNN computation graph as a collection of "pyramid" tasks, each executing a subset of the neurons or nodes across several layers, rather than just a subset of the nodes or neurons of a given layer. In a CNN the subset of network nodes can form an abstract shape of a pyramid; hence the name. The choice of neurons executed in each pyramid task can be designed to (1) fit the computation of the task, e.g. perfectly, into the cache of a computing core executing it, and thus minimize the number of times data must be moved from the cache into and out of memory, (2) maximize the utilization of computing cores by load balancing them across the depth of the computation graph rather than across a given layer, and (3) reduce the amount of data that needs to be brought to memory at the same time from being proportional to the size of a layer to being proportional to the size of the sum total of the processors' cache sizes.

Each task can be a set of compute instructions with a set of inputs that are dependent on prior tasks and an output that will feed into subsequent tasks. The nodes or neurons in a task can be chosen so as to minimize the amount of data moved during the computation, allowing, for example, to repeatedly swap data within the same regions of cache, in order to make a task execution completely compute bound, that is, spend most of its time computing on the same data rather than on bringing new data from memory. This non-layered pyramidal approach can differ from prior art approaches where one waits for the completion of the computation of all the nodes or neurons of a given network layer before proceeding to compute the following layer, typically incurring large penalties because of memory traffic.

In a pyramid implementation, a first set of tasks may output to a second set of tasks which may output to a third set of tasks. For each output an algorithm may recursively move back in the layers, aggregating the sub-computations necessary to compute this single output. Determining which input is required for an ultimate output may be repeatedly applied backwards through a reshuffle (e.g. taking data and either storing it in a different order or designing code that accesses the data in a different order, a virtual reshuffle) and a matrix multiply and stop in a matrix multiply as the total memory capacity is reached. Next, all the computations needed to create the inputs to a certain task (which are the outputs of other tasks), are aggregated into a new set of pyramid tasks that each are calculated backwards to include re-shuffle, pooling, and the layers of a Winograd transformed convolutional computation without the Winograd initial transform (because the tasks maximal total cache memory is already met). After, in turn, each of the inputs to a task may be computed via a new set of pyramidal tasks that span the Winograd forward transform, pooling, and direct convolution layers.

One embodiment applies methods as described herein combined with a pyramidal processing approach for a VGG-type network. The first convolutional layer of a VGG NN may take a two dimensional input image with dimensions 224×224 and with three input channels (RGB). The output of the layer has 64 channels, and hence, there may be 64×3 convolutional kernels each of dimensions 3×3. With padding 1 and stride 1 along each dimension this may lead to an output of the same dimensionality 224×224 but with 64 channels. After applying the rectified linear unit (ReLU), this is then fed as input to the second convolutional layer, which has the same number of 64 output channels (as the input channels), and the same padding and strides as the first layer.

Hence, the output of the second convolutional layer is again 224×224 with 64 channels. This is then passed through a ReLU and a max-pooling of 2×2, reducing the dimensionality to 112×112. The next, third, convolutional layer has 128 output channels, but the same padding and strides as before that leaves the dimensionality of the output also 112×112 with 128 channels. The fourth convolutional layer follows after a ReLU, with same padding and strides and 128 output channels. Finally, a second max-pooling occurs after another ReLU. Because the number of channels is small, it makes sense to implement the first convolutional layer using a direct convolution, while the subsequent convolutional layers should be implemented using transforms.

On an AVX2 architecture, an embodiment may be able to create a pyramid task that starts at the beginning of the network and ends after the transform of the third convolutional layer (in such a case performing matrix multiplication probably cannot be afforded). This follows from the above calculations, as a process can afford 64 input and output channels in the transform of the second convolutional layer. Even though it does not make a difference in this particular example, in this context, the amount of computation is actually increased substantially, giving even more leeway in terms of the CMR requirements. In the first layer, an extra 3×3×3×2=54 FLOPS are performed per transformed input pixel, while the memory requirements are unchanged (in other words, higher compute utilization would be possible since more computation would be performed per the same amount of memory transferred).

On an AVX512 architecture, an embodiment may have a single pyramid that encompasses the first four convolutional layers, finishing after the transform or after the matrix multiply (before the inverse transform) of the fifth convolutional layer. The gain from the additional computation is still present, but relatively negligible since it is spread over multiple iterations of methods as described herein (since a pyramid question may include multiple convolutional layers). However, the maximum number of input and output channels in any of these fusions is 128, which is exactly the maximum established in some embodiments for having high compute utilization. It is worth noting that because of the max-pooling after two convolutional layers in such an example, even though the second layer (and the first use of a convolutional multiply as described herein) operates on 64 input and output channels, it may be necessary to pick a larger R for this layer when executed in such a pyramid, than if it was not executed as a part of a pyramid. This is consistent with the explanation herein of how the pyramidal tasks are constructed: the output of this layer is reduced by half by the max-pooling layer and then serves as an input of the next convolutional layer (also performed using the fused transform-multiply-inverse transform). That layer operates on 64 input channels and 128 output channels, and requires a certain R' of its own to have a good compute utilization. However, R can be larger than R' (in fact as much as roughly 4 times), since as mentioned, that layer has in one embodiment just 64 input and output channels.

In an embodiment used with a Resnet NN architecture, a first convolutional layer may have kernels with dimensions 7×7, and may be implemented with a transformed computation as described herein. On an AVX512 implementation it may be possible to combine the transformed computation of this layer in a pyramidal computation with the following pooling layer. In Resnet18 and Resnet34 architectures, for pairs of convolutional layers with kernel size 3×3 and number of input and output channels 64 (in the first block) or 128, embodiments may be applicable on both architectures and each such pair of two consecutive convolutional layers can also be combined in a single pyramid operation.

Depending on the pyramidal structure of the execution, inputs may or may not be read from the main memory, and the outputs may or may not be required to be written to the main memory. In a pyramidal approach, the input might already be in the cache (if it was just computed by the core) and similarly, the output may not be written to the main memory (if the core is going to perform more computation of next layers on it). These main memory requirements may affect every process that computes the output of a convolutional layer, and the advantages of embodiments of the present invention may be independent: even if such a process can no longer achieve full compute utilization (because of the compute utilization at the main memory level), it can still have a high compute utilization, and be better than alternatives because of the savings that occur after the inputs are read and before the outputs are written.

However, if only one of the requirements is given (e.g. only the input has to be read from main memory, or only the output has to be written to the main memory), an implementation can still achieve full compute utilization for the main memory, for the layers we typically considered. This is because the arithmetic intensity may be Cout/2 or Cin/2, compared to the main memory CMR of about 30 for an AVX512 implementation and about 12 for an AVX2 implementation.

Achieving good utilization when main memory accesses are required may include choosing or creating the distribution of main memory accesses among the computation. For example, in the case of a core performing just one task that consists of R tiles, the matrix multiplication may start after all transforms are completed (for performance reasons), and the inverse transform may start after all matrix multiplications are completed. If no specific organization is performed, a process may end up performing a lot of reads (for the inputs), followed by a lot of computation, and followed by a lot of writes (for the outputs). If these reads or writes are accessing the main memory, the corresponding part may be memory bound even if there is enough computation in the middle stage for the whole task to be compute bound (or have a high compute utilization). One way to deal with this is for the core to interleave main memory accesses and matrix-matrix multiplications between consecutive tasks. This means reading the inputs of the next task and/or writing the outputs of the previous task while performing the computationally heavy matrix multiplications of the current task. An embodiment may spread out the output memory accesses with the computation in the next task. The outputs may be written to the memory locations where they belong, in the desired memory alignment, which may or may not be particularly cache friendly. The cache coherence algorithm for a particular processor will generally store this data in the cache first, and it will then be gradually flushed to the main memory, facilitated by the fact that the core will not be accessing the same output data again, while the cache gets used for the inputs and right-hand matrices of the next task. It is important to note that at the end of the task an embodiment may not rely on any particular data being present in the local, dedicated or private cache, so the evictions resulting from writing the output are not problematic. While an embodiment may rely on right-hand matrices being available in the shared cache, this is also acceptable as the shared cache is typically much larger than the private caches and these matrices are kept "hot" by all cores.

Similarly, for reading, the input tiles of the next task should be brought to the private or dedicated (e.g. L2) cache of the core (since the shared, e.g. L3, cache is shared and less reliable for keeping the data), interleaved with the computation in the matrix-matrix multiplication of the current task. This data should then be kept in the cache before the next task starts, as otherwise it would have to be re-read from main memory. However, during the matrix multiplication step, an embodiment may have significant pressure on the private or dedicated cache. A process may rely on certain data being available in the private or dedicated cache, to an extent that there may be shared buffer to save half of the memory. Additionally, the right-hand matrices may be brought to the private or dedicated cache for the corresponding multiplications. Therefore, adopting this approach may limit the change, and the computations in the memory requirements section (in particular, Requirement 3, shared buffer should fit in the dedicated cache) may be performed differently to account for less of the dedicated cache being available. The amount of reduction may be the memory used for storing the input tiles of the next task, and correspondingly, it is beneficial to have this data to have a good (e.g. continuous) memory layout.

If the original (e.g. input) tiles are stored in a certain data layout, streaming instructions could be utilized to bring a value of the memory location to the relevant core's register while bypassing the cache. One may stream the data and store it into a good layout, which will be cached. Hence, the memory requirement for storing the next task's inputs will not be larger than the memory required for the transformed tiles of the current task. A process may still use the shared buffer for the current task, but should also keep some extra space for the untransformed tiles of the next task. When the next task starts, these tiles may be transformed directly into the buffer, setting the stage for the matrix-matrix multiplications of the next task. In such a case using the shared buffer still saves memory—when the number of input and output channels is the same, a process may use shared buffer and roughly the same amount of extra memory for the tiles of the next task. Without this improvement, a process may need to store the left-hand matrices and results of the computation separately, in addition to the extra space. Hence, in some embodiments savings of about 33% may occur, which allows storing larger matrices (e.g. using larger R), and almost directly translates into an improvement in compute utilization.

Reading the pieces of the input of the next task to the local, core-private cache should in a pyramids embodiment be spaced out among the computation of the current task. One way to do this is based on the current left-hand matrix, e.g. a process may choose to read the corresponding untransformed input of the next task. However, a process may also need to re-read the pieces of input (e.g. keep them "warm" in cache) that were read earlier, e.g. during the first of the $T^2$ matrix multiplications, to avoid their eviction from the private cache (which can happen, for instance, due to the right-hand matrices being loaded).

It could also be that the previous pyramidal task ended with the transform, and the input data is already in transformed tiles, in which case a process may read and prefetch exactly the required left-hand matrices from the transformed input. Hence, the distribution of reads among the matrix computation would not be a problem. Another helpful scenario could be a longer pyramidal task that ends with intensive computation that does not place much pressure on the private cache, such as a part of direct convolution. Then, reading the input tiles of the next task can be interleaved with this computation at the end of the task.

Embodiments of the present invention may provide improvements by allowing executing transformed computation of a convolutional layer with the goal to be efficient for a common set of parameters for convolutional layers in common networks that are typically memory bound. In cases when it makes transformed computation much more efficient, embodiments of the present invention could be a decisive factor in improving the use of a transformed computation, when otherwise direct convolution would be used. In prior art systems, a direct convolution is used for some layers, often the first layer of the networks with very few channels, or when convolutional stride size is not 1 (which may allow direct convolution to save on the amount of computation).

In the future, with the improvement of processors, increase in the cache sizes, and development of new techniques for neural network compression, embodiments of the present invention may become the best approach for a much wider range of parameters, and hence for more types of convolutional layers. A shared buffer scheme as described herein may be a general way to save space in layered computation when pieces of output are incrementally generated based on the pieces of input.

Figure 6:
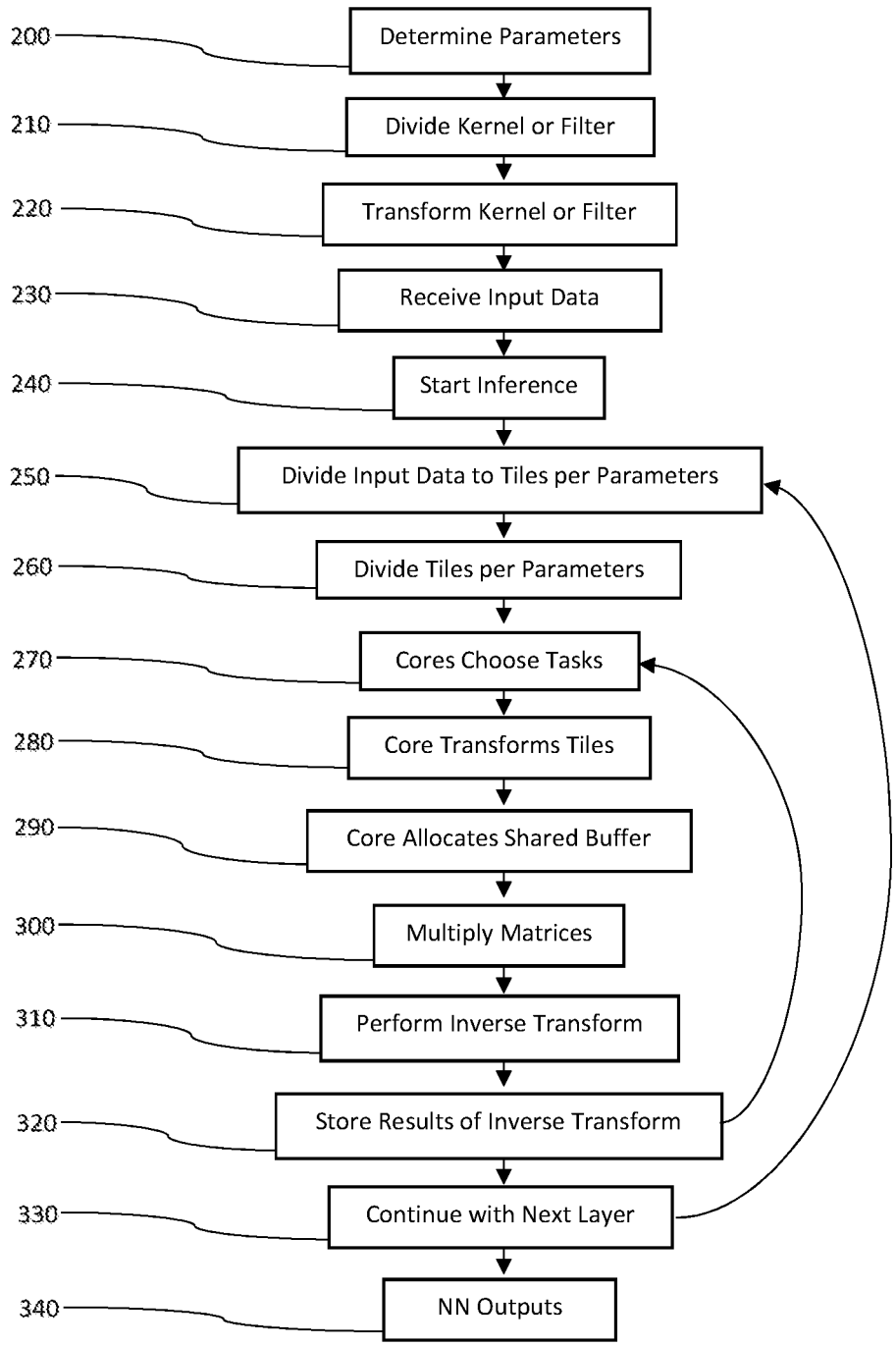
FIG. 6 is a flowchart of a method according to embodiments of the present invention.

FIG. 6 is a flowchart of a method according to embodiments of the present invention. While in one embodiment a computer system and NN as shown in FIGS. 1 and 2 may be used, in other embodiments other hardware may be used. Typically, the operations of FIG. 6 are carried out or executed by a computer processor including a number of cores, a shared cache shared among the cores, and each core associated with a local or private cache used by that core only.

In operation 200, parameters may be determined or chosen for a target architecture (e.g. a specific multi-core processor) to be used to execute a NN. For example, a parameter T may be chosen governing how many matrices can fit conformably in the shared (shared among cores) of the target processor. A parameter R may be chosen governing the division of tiles into task blocks, where R is chosen such that the amount of data used by left-hand (data) and product or result matrices takes up only a portion of a local or dedicated cache. The "requirements" such as Requirements 1, 2 and 3 discussed above may be used to set parameters, although as discussed these "requirements" need not be strictly held to. In some embodiments, if more than one layer has its data divided according to the parameters, the parameters may be different for each of the layers.

In operation 210 the kernel or filter data for the NN may be divided according to the chosen parameters, typically for certain convolutional layers for which a transform-multiply-inverse transform operation is used. Tiles may be created from kernel data based on the parameter T. Some layers need not have kernel or filter data divided in this manner, and some non-convolutional layers may have kernel data divided, and may be processed according to further operations described below.

Typically, the kernel data may be divided in correspondence with a later division of input data for that same layer. For example, the input data may be divided according to T and R, such that AllTiles=tiles of size T×T (for an input channel), and CoreTiles=AllTiles partitioned into blocks of R tiles. The kernel data may then be divided based on the same parameter T. However, T may be chosen in such a way that the whole kernel (for each input-output channel pair) of dimensionality Kx×Ky (or Kx×Ky×Kz in a 3 dimensional case) fits into a single tile of size T×T.

In operation 220 a pre-computation operation may be performed, and the divided kernel or filter data for the NN may be transformed, in advance of inference or execution. Typically, at inference, a NN that has been trained is executed repeatedly using different input data. For example, a NN trained to recognize images of cats may have kernels (based on filters) trained in advance and then at inference may be executed repeatedly using different data (e.g. determining whether or not different images show cats) using the same link weights and kernel data. Thus, in some embodiments the kernel data used to multiply by the input data may be partitioned (per the parameters determined in operation 200) and transformed (the first operation of the transform-multiply-inverse transform operation) in advance, before inference, once, rather than at each inference. A set of transformed kernel matrices may thus be created where the set of transformed kernel matrices fits in cache of the processor shared by all cores.

In operation 230 input data for the NN may be received. For example, an image, a voice recording, a set of data, etc., which is to be processed, may be received.

In operation 240, inference may start, e.g. the NN may start processing the data. Typically, the NN processing the data means that a processor (e.g. as in FIG. 2) applies input data for each layer to weights of kernels for that layer and sends the output of each layer as input to the next layer, as described elsewhere herein. The processor performing the inference is typically the target architecture for which parameters have been created in operation 200.

In operation 250, for a certain layer, typically a convolutional layer, input data may be divided or partitioned into tiles according to the parameters determined in operation 100, and the same parameters used to partition the kernel data in operation 210. Tiles may be created from input data based on the parameter T; e.g. the grid of input data may be divided into typically overlapping squares or tiles for processing, where the size of tiles is T×T, and the number of tiles is (Xdim−Kx+1)/T×(Ydim−Ky+1)×B, as described elsewhere herein.

In operation 260, for a certain layer, typically a convolutional layer, the tiles created in operation 250 may be divided or partitioned according to the parameters determined in operation 200. For example, the tiles may be divided into blocks of R tiles each, e.g. tile sets each set including R tiles, to be processed, which may be called tasks. The number and size of each tile set may be according to the parameters chosen, e.g. the partition may be into (number of tiles)/R (rounded up) tile sets, each including R tiles (with one set possibly not including R tiles, but padded, e.g. if there are r<R tiles in a task, a process may populate only r of the R rows and do the computation for all R, using the output only for the actual r) each of dimension or size T×T, where the matrices being used and resulting from each block or tile set fits in a cache local to a core. Partitioning of the input data and the partitioning of the tile set may increase the likelihood that the transformed data matrices are stored in a local cache, which is a goal of various embodiments. In some embodiments, data designed to fit in a cache may not always fit in the cache.

In operation 270, a core of a set of cores may choose or have chosen for it a task, which may be a set or block of R tiles from the division or partition of operation 260. In some embodiments, tasks may be assigned to or chosen by cores based on the task assignment policy of the target processor. Known multicore synchronization methods may be used to ensure that a core being assigned or choosing a task (including a block of tiles) is the only core to execute that task, and tiles in that task are not executed by a different core. For example, a core may acquire a lock on data for the task. Typically, the processing of the tasks is not dependent on other partitioned tasks for the NN layer, and thus more than one core may perform operations 270-320 concurrently (if not simultaneously). To the extent that a block is defined for only one of multiple input channels, the core may choose tiles corresponding to or aligned with the block of tiles in input channels other than those of the chosen block. Typically, each core executes the same code or software for each task, the tasks differing in the data used. Cores may be configured to perform methods as described herein by executing code.

In operation 280, the core having chosen the task may transform, e.g. perform a transform operation on, each of the R tiles in the set or block of tiles for the task as part of a transform-multiply-inverse transform operation. In one embodiment, the organization of data and tasks is such that the data input (left matrices) and the output for the transform is likely to be in the cache private to the core, and the kernel input for the subsequent multiply is likely to be in the cache shared by all cores in the processor. The transform operation may produce a set of transformed data matrices, which as a group may fit in the local or private cache of the core.

Data to be transformed may exist in main or external memory, then be transformed, and placed (e.g. in a shared buffer) in a core's local cache. Typically, data from a prior task (e.g. set of multiply operation) is evicted from the private cache. However, if a process reuses the shared buffer across tasks, a new input may overwrite the part of the buffer where the previous input used to be (and parts of which were later overwritten by the results of the multiplication).

In operation 290, the core may allocate a block of memory, e.g. a shared buffer, to be used during matrix multiplication. While this block may be allocated to main memory external to the processor in which the core resides, due to the size of the block and the times the core accesses the block, the block is typically stored in a cache private to the core. In some embodiments, a core may allocate a shared buffer once and use the buffer for all tasks.

In operation 300, the core may multiply the matrices for the task. Typically in one series or set of multiply operations one core multiplies a block or subset of the data matrices (e.g. as defined by the task) by all right hand (e.g. kernel) matrices. The task may define a block of left (e.g. data) matrices, which due to their size and instructions' access to them may be stored in the cache private to the core, e.g. the block of memory allocated in operation 290. The matrices multiplied by left hand matrices may be the right hand (e.g. kernel) matrices stored in the cache shared by the cores of the processor. Each multiply operation may use or take as input a transformed data matrix and a transformed kernel matrix from the set of transformed kernel matrices. The set of multiply operations performed for a tile set or block typically uses the entire set of transformed kernel matrices for the NN layer.

The results of each multiply operation may be stored in a location, such that at least one result is stored in a location used to store a transformed data matrix, typically one used in a previous multiply operation. For example, during the matrix multiply operation, as each left hand matrix in the shared buffer is used to produce a product, the product may be stored in the shared buffer location used for a left matrix used in a previous multiply operation. In some embodiments, all but one of the results is stored in a location used to store a transformed data matrix, the first result being stored in a blank or preallocated portion of a shared buffer. A blank portion may store more than one result.

In operation 310, the core may perform an inverse transform on the results or products from the multiply operations performed in operation 300. Typically the same core performing the multiply for a task performs the inverse transform. Typically, the results of the multiply operation are cumulatively stored in the shared buffer and thus in the cache local to the core performing the multiply (operation 300) and inverse transform.

In operation 320, the results of the inverse transform operations may be stored.

Operations 270-320 may be repeated as long as tasks or blocks of tiles exist for the particular layer, each different core executing the next available task to perform a transform-multiply-inverse transform operation.

In operation 330, if there are no more tasks or blocks for a particular layer, NN inference or processing may continue with the next layer. For a layer such as a convolutional layer that performs a transform-multiply-inverse transform operation, operations 250-320 may be repeated; otherwise NN processing for that layer may proceed without transform-multiply-inverse transform operations.

In operation 340, if no more layers exist for processing, the NN may provide an output.

Other or different operations may be used.

While embodiments have been described in the context of NN inference, data processing in other contexts may make use of matrix multiply methods as described herein. Embodiments of the invention may be applicable to NNs computed with any sort of processors, e.g. CPUs, GPUs, or other types of processors.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of executing matrix multiply operations for a neural network (NN), the method comprising, using a computer processor comprising a plurality of cores and a shared cache shared among the cores, each core associated with a local cache used by that core only:
    partitioning input data for a NN layer into a set of tiles using a parameter T, each tile being of size T×T;
    using a parameter R, partitioning the set of tiles into blocks of R tiles each; and
    for each block of R tiles, performing by a single core:
        a transform operation on the R tiles to produce a set of transformed data matrices, the set of transformed data matrices stored in the local cache of the single core; and
        a set of multiply operations, each multiply operation using a transformed data matrix of the set of transformed data matrices and a transformed kernel matrix from a set of transformed kernel matrices, the set of transformed kernel matrices stored in the shared cache, wherein a result of at least one of the multiply operations is stored in a location used to store a transformed data matrix.

2. The method of claim 1, wherein the partitioning of the input data and the partitioning of the tile set increase a likelihood that the transformed matrices are stored in a local cache.

3. The method of claim 1, wherein the location used to store the result of at least one of the multiply operations is a location used to store a transformed data matrix used in a previous multiply operation.

4. The method of claim 1, wherein the set of transformed kernel matrices is an entire set of transformed kernel matrices for the NN layer.

5. The method of claim 1, comprising performing by the core an inverse transform operation on the results of the multiply operations.

6. The method of claim 5, comprising, for a second NN layer:
    partitioning a portion of the results of the inverse transform operations into a second set of tiles using a parameter T', each tile being of size T'×T';
    using a parameter R', partitioning the second set of tiles into blocks of R' tiles each; and
    for each block of R' tiles, performing by a core a set of transform-multiply-inverse transform operations.

7. The method of claim 1, wherein the transformed data matrices for the NN layer fit within the shared cache.

8. A system for of executing matrix multiply operations for a neural network (NN), the system comprising a computer processor comprising:
    a plurality of cores each core associated with a local cache used by that core only; and
    a shared cache shared among the cores, wherein, for input data partitioned for a NN layer into a set of tiles using a parameter T, each tile being of size T×T and the set of tiles partitioned using a parameter R into blocks of R tiles each:
        each single core configured to, for a block of R tiles perform:
            a transform operation on the R tiles to produce a set of transformed data matrices, the set of transformed data matrices stored in the local cache of the single core; and
            a set of multiply operations, each multiply operation using a transformed data matrix of the set of transformed data matrices and a transformed kernel matrix from a set of transformed kernel matrices, the set of transformed kernel matrices stored in the shared cache, wherein a result of at least one of the multiply operations is stored in a location used to store a transformed data matrix.

9. The system of claim 8, wherein the partitioning of the input data and the partitioning of the tile set increase a likelihood that the transformed matrices are stored in a local cache.

10. The system of claim 8, wherein the location used to store the result of at least one of the multiply operations is a location used to store a transformed data matrix used in a previous multiply operation.

11. The system of claim 8, wherein the set of transformed kernel matrices is an entire set of transformed kernel matrices for the NN layer.

12. The system of claim 8, wherein the core is configured to perform an inverse transform operation on the results of the multiply operations.

13. The system of claim 12, wherein for a second NN layer a portion of the results of the inverse transform operations is partitioned into a second set of tiles using a parameter T', each tile being of size T'×T', and the second set of tiles is partitioned using a parameter R' into blocks of R' tiles each; and each single core is configured to, for a block of R' tiles, perform a set of transform-multiply-inverse transform operations.

14. The system of claim 8, wherein the transformed data matrices for the NN layer fit within the shared cache.

15. A method of performing inference for a neural network (NN), the method comprising, in a computer processor comprising a plurality of cores, a shared cache, and a private cache used by each core, the method comprising:
using input data divided into a set of tiles using a parameter T, each tile being of size T×T, the set of tiles divided into blocks of tiles, for each block of tiles, a single core executing a transform-multiply-inverse transform operation on the block of tiles, such that a set of transformed data matrices is stored in the local cache of the single core, wherein the transform-multiply-inverse transform operation operates on a transformed kernel matrix, the transformed kernel matrix stored in the shared cache, and wherein results of a multiply operation is stored in a location used to store a transformed data matrix.

16. The method of claim 15, wherein the division of the input data and the division of the tile set increase a likelihood that the transformed matrices are stored in a local cache.

17. The method of claim 15, wherein the location used to store the result is a location used to store a transformed data matrix used in a previous multiply operation.

18. The method of claim 15, wherein, for a second NN layer a portion of the results of the inverse transform operations are partitioned into a second set of tiles using a parameter T', each tile being of size T'×T', and wherein the second set of tiles is partitioned using a parameter R' into blocks of R' tiles each, wherein the method comprises for each block of R' tiles, performing by a core a set of transform-multiply-inverse transform operations.

19. The method of claim 15 wherein in the transform-multiply-inverse operation a set of transformed kernel matrices used in the transform-multiply-inverse operation fits in the shared cache.

* * * * *